(12) United States Patent
Rivera

(10) Patent No.: US 11,021,284 B2
(45) Date of Patent: Jun. 1, 2021

(54) METHOD OF CONSTRUCTING AN ESPRESSO CARTRIDGE

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 306 days.

(21) Appl. No.: 15/286,845

(22) Filed: Oct. 6, 2016

(65) Prior Publication Data

US 2017/0361961 A1 Dec. 21, 2017

Related U.S. Application Data

(63) Continuation-in-part of application No. 15/256,929, filed on Sep. 6, 2016, which is a continuation-in-part of application No. 15/187,444, filed on Jun. 20, 2016, now Pat. No. 9,586,709.

(51) Int. Cl.

| B65B 29/02 | (2006.01) |
|---|---|
| B65B 7/28 | (2006.01) |
| B65B 67/02 | (2006.01) |
| B65B 1/24 | (2006.01) |
| B30B 1/04 | (2006.01) |
| B30B 15/06 | (2006.01) |
| A47J 31/06 | (2006.01) |

(52) U.S. Cl.
CPC ........... *B65B 29/02* (2013.01); *A47J 31/0689* (2013.01); *B30B 1/04* (2013.01); *B30B 15/065* (2013.01); *B65B 7/2864* (2013.01); *B65B 29/022* (2017.08); *B65B 67/02* (2013.01); *B65B 1/24* (2013.01)

(58) Field of Classification Search
CPC ......... B65B 1/24; B65B 29/02; B65B 29/022; B65B 67/02; B30B 1/04; B30B 15/065; A47J 31/0673; A47J 31/0689; A47J 31/407; B65D 85/8043
See application file for complete search history.

(56) References Cited

U.S. PATENT DOCUMENTS

| 643,443 A | 2/1900 | Aiken |
| 818,812 A | 4/1906 | Bartholomew |
| 2,046,367 A | 7/1936 | Collins |
| 2,181,945 A | 12/1939 | Komarik |

(Continued)

FOREIGN PATENT DOCUMENTS

| DE | 2003483 A1 | 8/1971 |
| DE | 3514512 C1 | 6/1986 |

(Continued)

*Primary Examiner* — Stephen F. Gerrity
(74) *Attorney, Agent, or Firm* — IP Strategies

(57) ABSTRACT

A bottom fillable espresso cartridge base and apparatus and method for filling and plugging the bottom of the espresso cartridge base. The espresso cartridge base includes an open bottom and a press in bottom plug. The top of the espresso cartridge may be sealed by a foil lid or the like, or be open and an adhesive attachable lid may be included for attachment by a user. A first method utilizes a hand held multi-function tool including a cartridge holder with a holder lid to capture the espresso cartridge, and a bottom tamper and plug seating arm. A second method utilizes a stationary base residing on a flat surface, a cartridge holder to retain cartridges on the base, and individual tools to fill and tamp brewing material in the cartridge, and to attach the bottom plug to the cartridge.

14 Claims, 21 Drawing Sheets

(56) References Cited

U.S. PATENT DOCUMENTS

| | | | |
|---|---|---|---|
| 2,524,243 A * | 10/1950 | Wicklund | B65B 67/02 |
| | | | 141/341 |
| 2,626,738 A | 1/1953 | Nordquist | |
| 2,693,752 A | 11/1954 | Garapolo | |
| 3,748,819 A | 7/1973 | Christensson | |
| 4,338,765 A * | 7/1982 | Ohmori et al. | B65B 7/2878 |
| | | | 53/452 |
| 4,957,753 A | 9/1990 | Bardsley et al. | |
| 5,526,733 A | 6/1996 | Klawuhn et al. | |
| 5,637,335 A | 6/1997 | Fond et al. | |
| 5,941,055 A | 8/1999 | Coates | |
| 6,260,475 B1 * | 7/2001 | Tegel et al. | B30B 1/04 |
| | | | 100/125 |
| 6,481,338 B1 | 11/2002 | Wai | |
| 8,479,638 B2 | 7/2013 | Leung et al. | |
| 9,586,709 B1 * | 3/2017 | Rivera | B65B 29/02 |
| 2007/0144357 A1 * | 6/2007 | Rivera | B65B 29/022 |
| | | | 99/295 |
| 2011/0162533 A1 | 7/2011 | Fumagalli | |
| 2013/0139699 A1 * | 6/2013 | Rivera | B65D 85/8043 |
| | | | 99/295 |
| 2013/0167729 A1 | 7/2013 | Hoare et al. | |
| 2013/0186046 A1 * | 7/2013 | Magniet et al. | B65D 85/8043 |
| | | | 53/492 |
| 2014/0290493 A1 * | 10/2014 | Rivera | A47J 31/407 |
| | | | 99/285 |
| 2016/0157661 A1 | 6/2016 | Torquemada | |
| 2016/0257548 A1 * | 9/2016 | Rivera | A47J 43/28 |

FOREIGN PATENT DOCUMENTS

| | | | |
|---|---|---|---|
| DE | 102006010772 A1 | 9/2007 | |
| DE | 102010048513 A1 * | 4/2012 | A47J 31/0689 |
| DE | 102013005597 A1 | 10/2014 | |
| EP | 0524464 A1 | 1/1993 | |
| EP | 1576912 A2 | 9/2005 | |
| EP | 1997748 A1 | 12/2008 | |
| FR | 620589 A * | 4/1927 | B30B 1/04 |
| FR | 2620680 A1 | 3/1989 | |
| FR | 2895660 A1 | 7/2007 | |
| FR | 2900810 A1 | 11/2007 | |
| FR | 3022533 A1 * | 12/2015 | B65B 29/02 |
| WO | WO 2007080258 A2 | 7/2007 | |
| WO | WO 2012080814 A1 | 6/2012 | |
| WO | WO-2014041419 A1 * | 3/2014 | B65D 85/8043 |
| WO | WO 2015118446 A1 | 8/2015 | |
| WO | WO 2016001883 A1 | 1/2016 | |

* cited by examiner

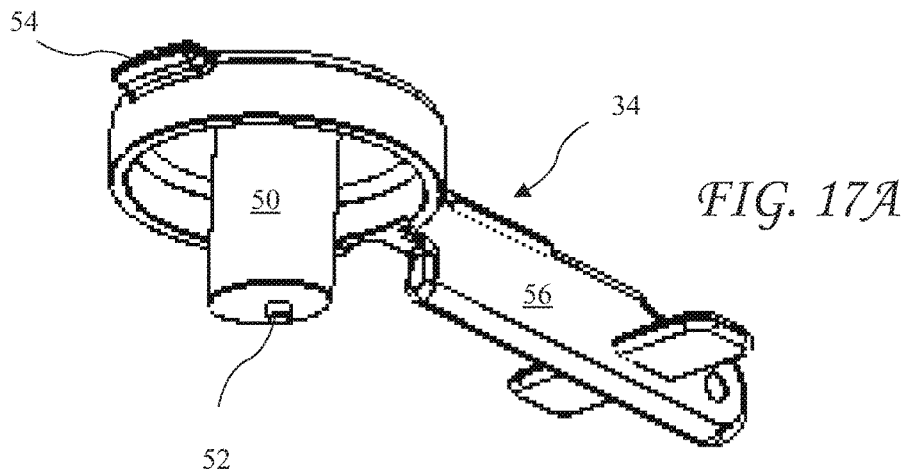
FIG. 17A
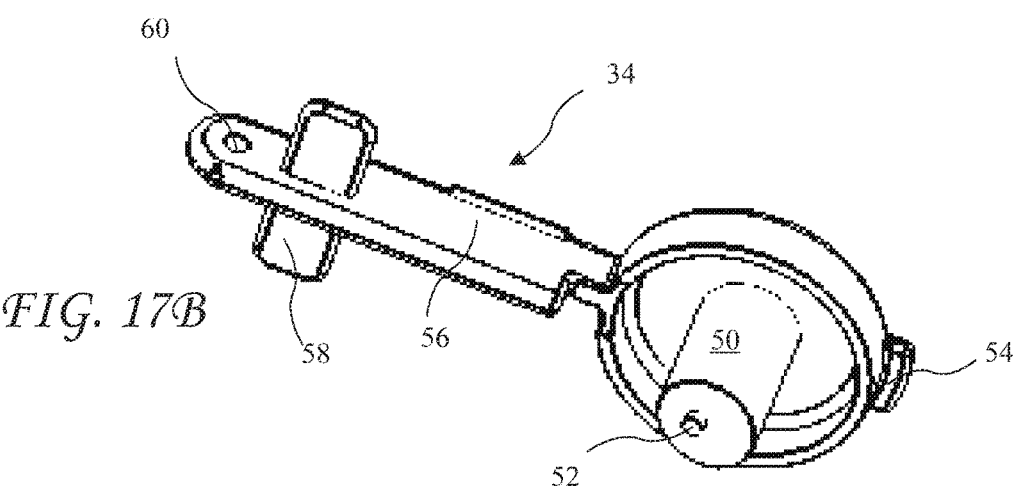
FIG. 17B
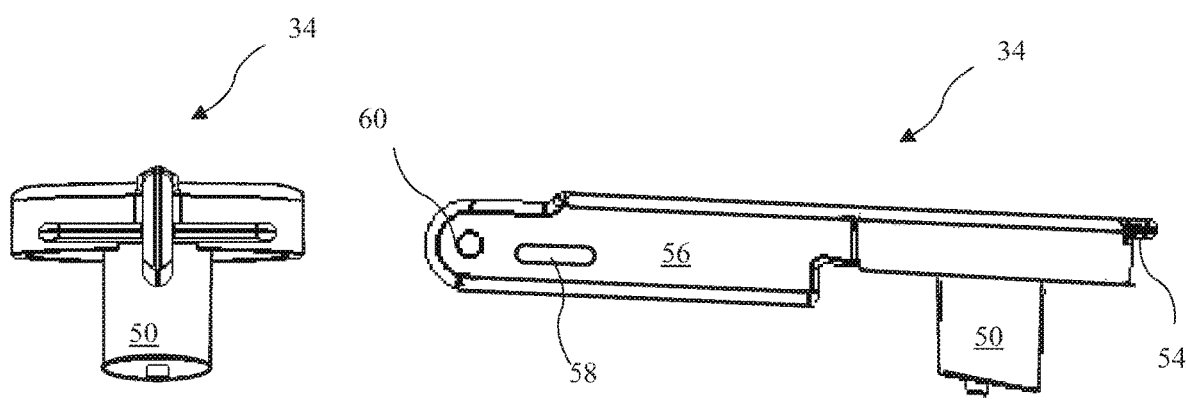
FIG. 18B
FIG. 18A

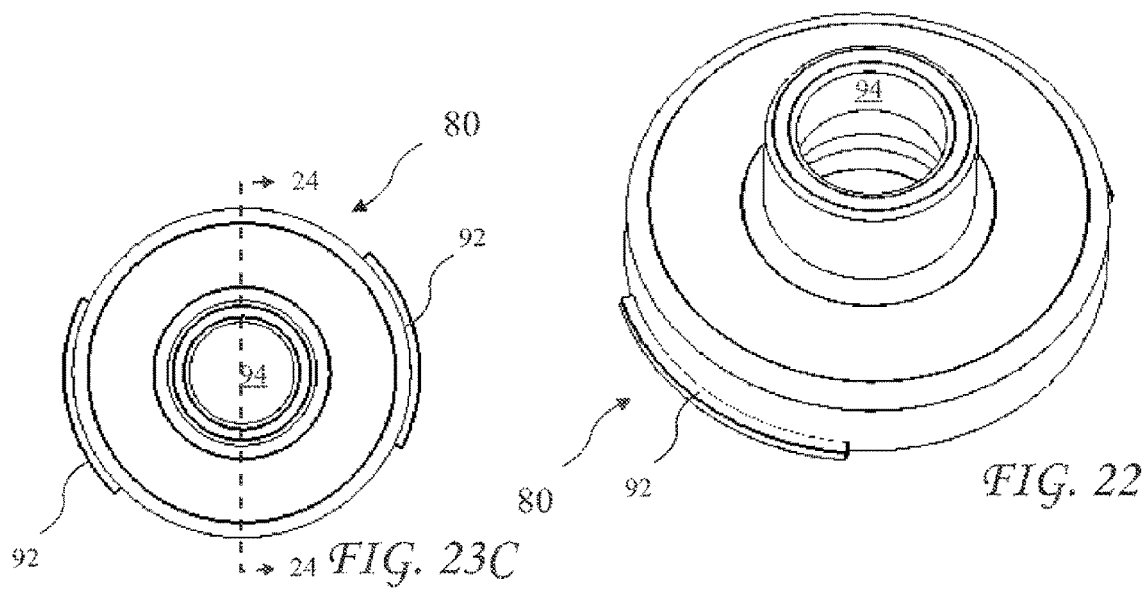
FIG. 23C
FIG. 22
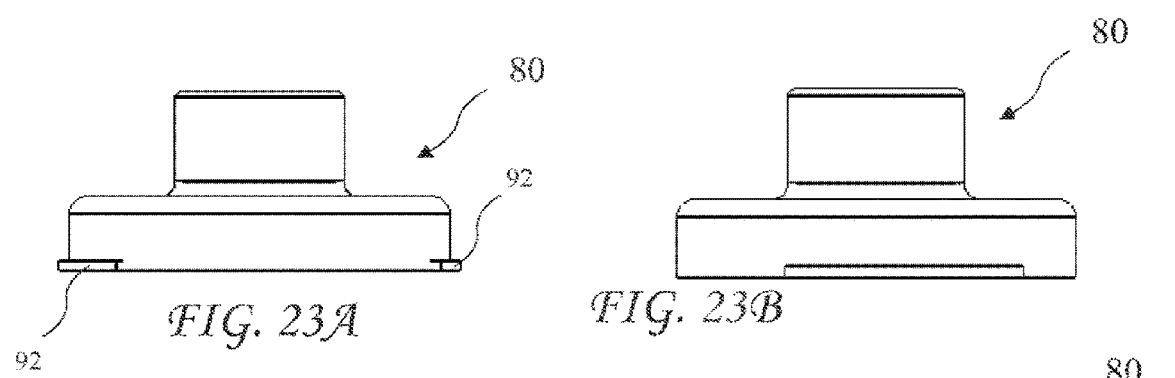
FIG. 23A
FIG. 23B
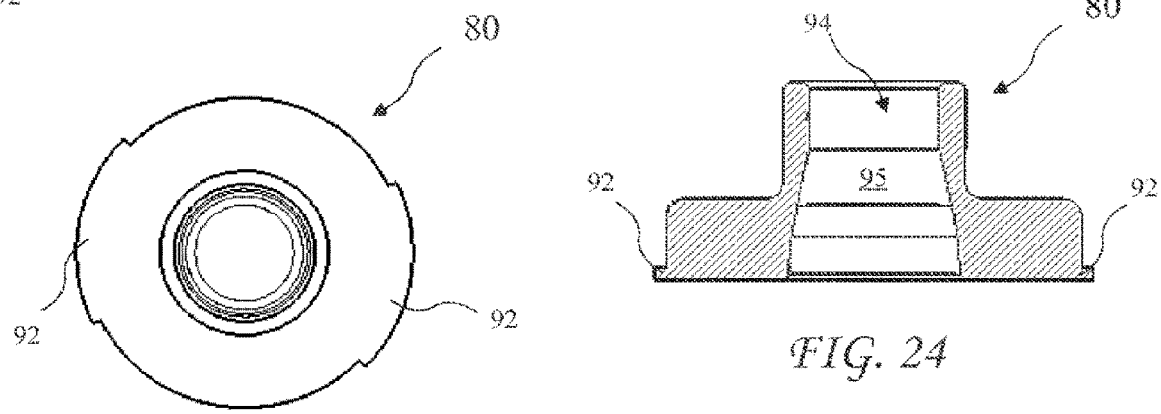
FIG. 23D
FIG. 24

METHOD OF CONSTRUCTING AN ESPRESSO CARTRIDGE

CROSS-REFERENCE TO RELATED APPLICATIONS

The present application is a Continuation In Part of U.S. patent application Ser. No. 15/187,444 filed Jun. 20, 2016, and a Continuation In Part of U.S. patent application Ser. No. 15/256,929 filed Sep. 6, 2016 which applications are incorporated in their entirety herein by reference.

BACKGROUND OF THE INVENTION

The present invention relates to brewed beverages and in particular to espresso cartridges.

Espresso beverages are made by forcing high pressure water through tightly packed, finely ground coffee. The ground coffee is contained in a holder commonly called a "portafilter" or into an espresso cartridge. High-pressure water is forced through the ground coffee and beverage is extracted in small, concentrated amounts. Many espresso drinkers prefer the simplicity of using the espresso cartridges, but are limited in the selection of ground coffee to varieties available in the pre-packaged espresso cartridges, and the cost of a single cartridge.

BRIEF SUMMARY OF THE INVENTION

The present invention addresses the above and other needs by a bottom fillable espresso cartridge base and apparatus and method for filling and plugging the bottom of the espresso cartridge base. The espresso cartridge base includes an open bottom and a press in bottom plug. The top of the espresso cartridge may be sealed by a foil lid or the like, or be open and an adhesive attachable lid may be included for attachment by a user. A first method utilizes a hand held multi-function tool including a cartridge holder with a holder lid to capture the espresso cartridge, and a bottom tamper and plug seating arm. A second method utilizes a stationary base residing on a flat surface, a cartridge holder to retain cartridges on the base, and individual tools to fill and tamp brewing material in the cartridge, and to attach the bottom plug to the cartridge.

In accordance with one aspect of the invention, there is provided a fillable espresso cartridge. The espresso cartridge includes a cartridge base having frustoconical shaped walls, an open bottom, and a sealed top or an open top and sealing material, and a bottom plug attachable to the bottom of the cartridge base. The base is shaped like known espresso cartridges having a frustoconical shape with the top diameter larger than the bottom diameter. After filling through the bottom, the plug is pressed into the bottom of the cartridge base to complete the espresso cartridge. The plug may include preformed ports for releasing brewed espresso, or weakened areas may be provided in the plug which seal the espresso cartridge after construction and rupture during use.

In accordance with another aspect of the invention, there is provided a hand held tool and method for constructing an espresso cartridge. The tool includes a frame including a cartridge holder configured to hold the espresso cartridge base with the open smaller cartridge base bottom aligned with an open mouth, and a tamper/seater pivotally attached to the frame and including a tamper insertable into the mouth when the tamper/seater is pivoted. The method includes inserting a frustoconical shaped cartridge base into a cartridge holder, an open cartridge base bottom first into the cartridge holder, the cartridge base bottom diameter smaller than a cartridge base top opposite to the cartridge base bottom, closing a lid to retain the cartridge base in the cartridge holder, scooping a portion of untamped brewing material through a holder mouth and the smaller cartridge base bottom of the cartridge, leveling the untamped brewing material in the holder mouth and cartridge base, pressing a tamping plunger through the holder mouth and into the cartridge holder, tamping the untamped brewing material completely into the cartridge base, withdrawing the tamper piston from the holder mouth, placing a bottom plug into the holder mouth and against the smaller cartridge base bottom of the cartridge base, seating the bottom plug in the smaller base bottom of the cartridge, and removing the finished cartridge from the cartridge holder.

In accordance with yet another aspect of the invention, there is provided a counter top tool and method for constructing an espresso cartridge. The tool includes a tool base configured to reside on a generally horizontal surface, a cartridge seat having locking features on the tool base, a cartridge lock configured to engage the locking features to retain a cartridge base on the cartridge seat and including a mouth aligned with the open cartridge base bottom of the cartridge base, a scoop configured to measure a single serving of brewing material, a funnel insertable into the mouth of the mouth of the cartridge lock to facilitate pouring the single serving of brewing material into the mouth and cartridge base, a tamper for tamping the single serving of brewing material in the cartridge base, and a seating tool for seating the bottom plug in the open cartridge base bottom of the cartridge base. The method includes the steps of placing a frustoconical shaped brewing cartridge base onto a cartridge seat of a tool base, a closed cartridge base top against the cartridge seat, the cartridge base top having a larger diameter than an open cartridge base bottom opposite the cartridge base top, attaching a cartridge lock to the tool base to retain the cartridge base against the tool base, scooping a portion of brewing material, leveling the brewing material in the scoop, pouring the brewing material through a mouth of the cartridge lock and the open bottom end of the cartridge base, into the cartridge base, tamping the untamped brewing material into the cartridge base, placing a bottom plug into the cartridge holder against the small end of the cartridge, seating the bottom plug into the cartridge base, and removing the finished cartridge from the tool.

In accordance with still another aspect of the invention, there is provided a single scoop/tamper/seating tool for use with the counter top tool and with the method for constructing an espresso cartridge. The single scoop/tamper/seating tool provides a scoop to collect a serving of brewing material, a sliding level to obtain an accurate amount of the brewing material before pouring the brewing material into the espresso cartridge, a tamper to tamp the brewing material in the espresso cartridge, and a guide hole pin to center a bottom plug during seating by the single scoop/tamper/seating tool.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 17A shows a first isometric view of a tamper/seater of the hand held tool according to the present invention.

FIG. 17B shows a second isometric view of a tamper/seater of the hand held tool according to the present invention.

FIG. 18A shows a side view of a tamper/seater of the hand held tool according to the present invention.

FIG. 18B shows a rear view of a tamper/seater of the hand held tool according to the present invention.

FIG. 22 shows an isometric view of the cartridge lock according to the present invention.

FIG. 23A shows a side view of the cartridge lock according to the present invention.

FIG. 23B shows a side view of the cartridge lock according to the present invention rotated 90 degrees.

FIG. 23C shows a top view of the cartridge lock according to the present invention.

FIG. 23D shows a bottom view of the cartridge lock according to the present invention.

FIG. 24 shows a cross-sectional view of the cartridge lock according to the present invention taken along line 24-24 of FIG. 23C.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
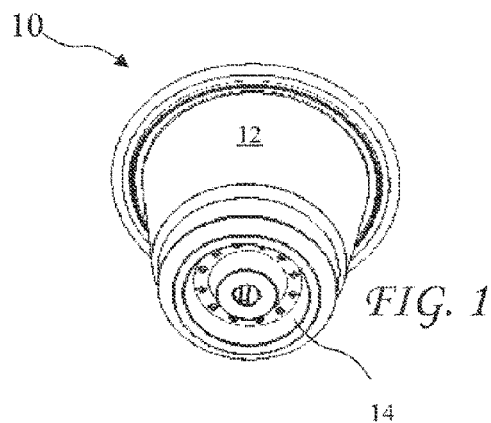
FIG. 1 shows a bottom isometric view of a cartridge according to the present invention.
Figure 2A:
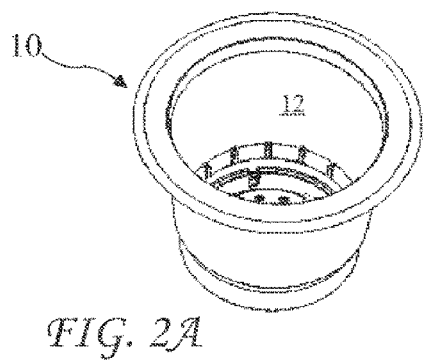
FIG. 2A shows a top isometric view of the cartridge according to the present invention with the cartridge base top open.
Figure 3B:
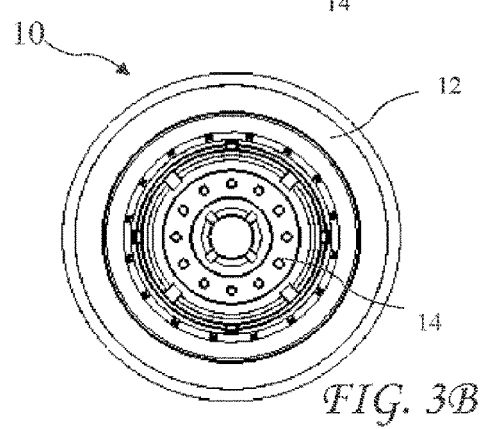
FIG. 3B shows a top view of the cartridge according to the present invention.
Figure 2B:
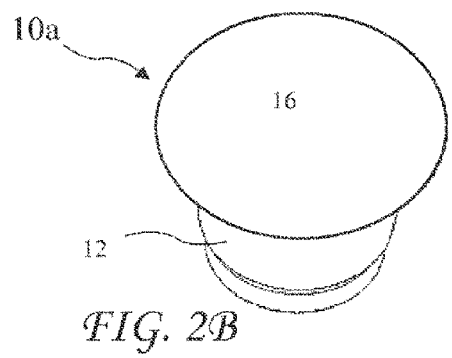
FIG. 2B shows a top isometric view of the cartridge according to the present invention with the cartridge base top closed.
Figure 3A:
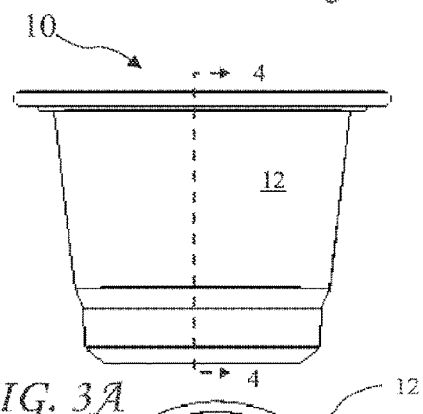
FIG. 3A shows a side view of the cartridge according to the present invention.
Figure 4:
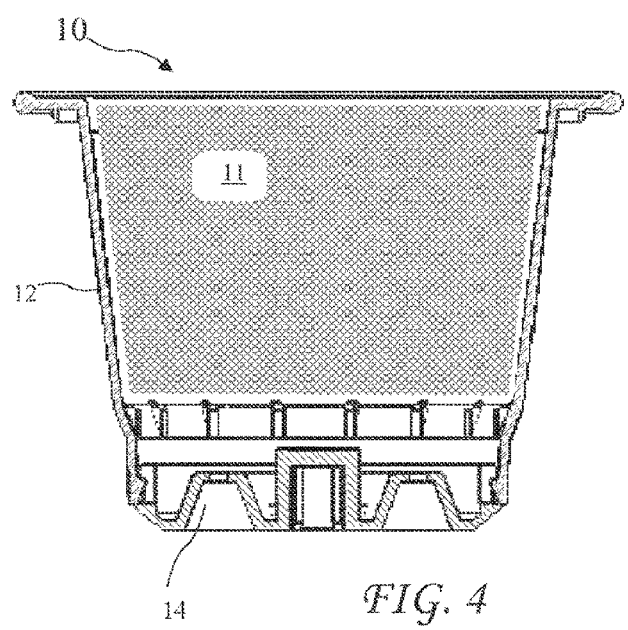
FIG. 4 shows a cross-sectional view of the cartridge according to the present invention taken along line 4-4 of FIG. 3A.
Figure 3C:
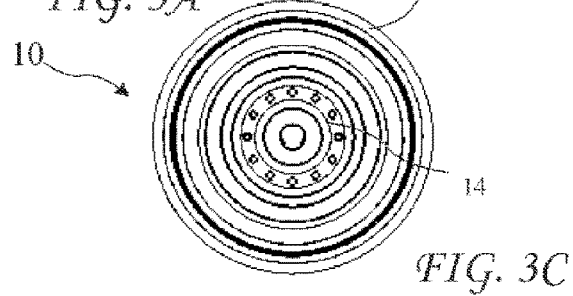
FIG. 3C shows a bottom view of the cartridge according to the present invention.

FIG. 1 shows a bottom isometric view of a cartridge 10 according to the present invention, FIG. 2A shows a top isometric view of the cartridge 10 with the cartridge base top 12a (see FIG. 8) open, FIG. 2B shows a top isometric view of the cartridge 10 with the cartridge base top 12a closed, FIG. 3A shows a side view of the cartridge 10, FIG. 3B shows a top view of the cartridge 10, FIG. 3C shows a bottom view of the cartridge 10, and FIG. 4 shows a cross-sectional view of the cartridge 10 taken along line 4-4 of FIG. 3A, containing brewing material 11. The cartridge 10 may be provided with the cartridge base top 12a open, or with foil material 16, or the like sealing the cartridge base top 12a. When the cartridge is provided with the cartridge base top 12a open, the foil material 16 may be attached to the cartridge base 12 before filling the cartridge base with brewing material. A bottom plug 14 is inserted into the cartridge base 12 after filling the cartridge base 12 through an open cartridge base bottom 12b (see FIG. 8)

Figure 5:
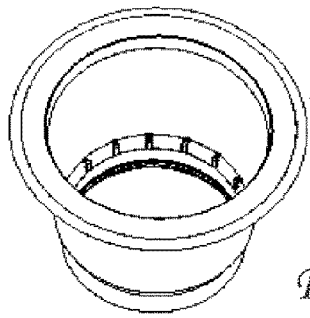
FIG. 5 shows a top isometric view of a cartridge base according to the present invention.
Figure 6:
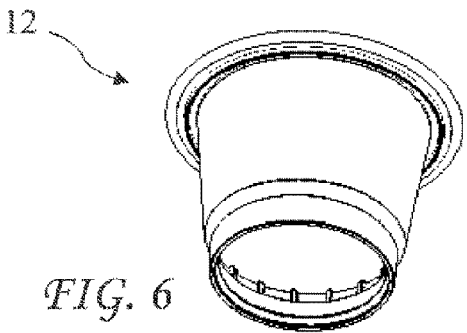
FIG. 6 shows a bottom isometric view of the cartridge base according to the present invention.
Figure 7B:
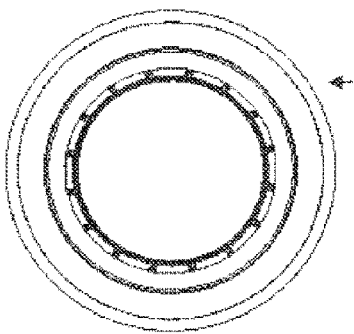
FIG. 7B shows a top view of the cartridge base according to the present invention.
Figure 7A:
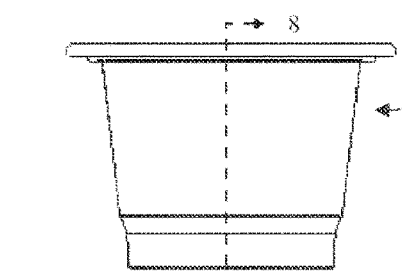
FIG. 7A shows a side view of the cartridge base according to the present invention.
Figure 8:
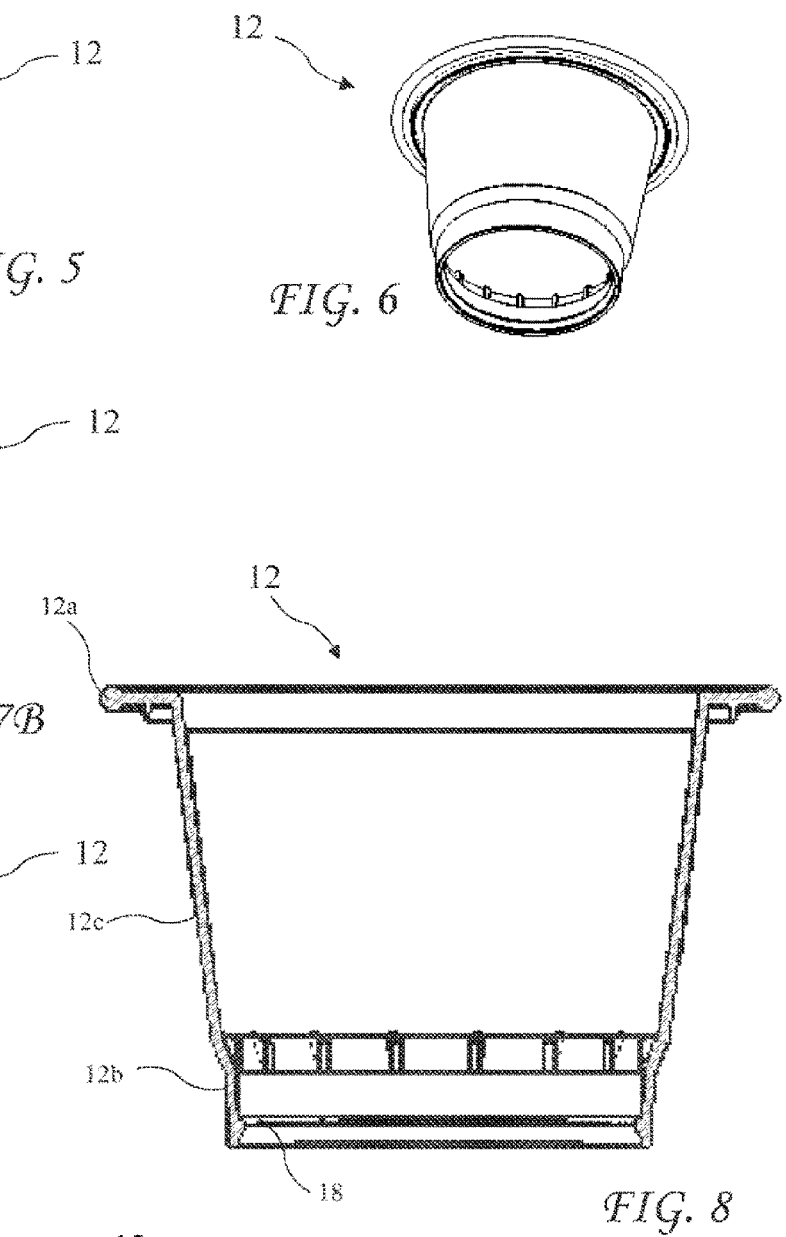
FIG. 8 shows a cross-sectional view of the cartridge base according to the present invention taken along line 8-8 of FIG. 7A.
Figure 7C:
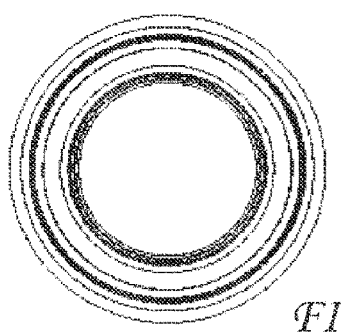
FIG. 7C shows a bottom view of the cartridge base according to the present invention.

FIG. 5 shows a top isometric view of the cartridge base 12, FIG. 6 shows a bottom isometric view of the cartridge base 12, FIG. 7A shows a side view of the cartridge base 12, FIG. 7B shows a top view of the cartridge base 12, FIG. 7C shows a bottom view of the cartridge base 12, and FIG. 8 shows a cross-sectional view of the cartridge base 12 taken along line 8-8 of FIG. 7A. The cartridge base 12 includes the base top 12a, the open base bottom 12b, and frustoconical shaped walls 12c. The base bottom 12b has a smaller diameter than the base top 12a. An interior annular ridge 18 in the base bottom 12b engages an exterior annular recess 22 (see FIG. 9A) in the bottom plug 14 to retain the bottom plug 14 in the base bottom 12b.

Figure 9B:
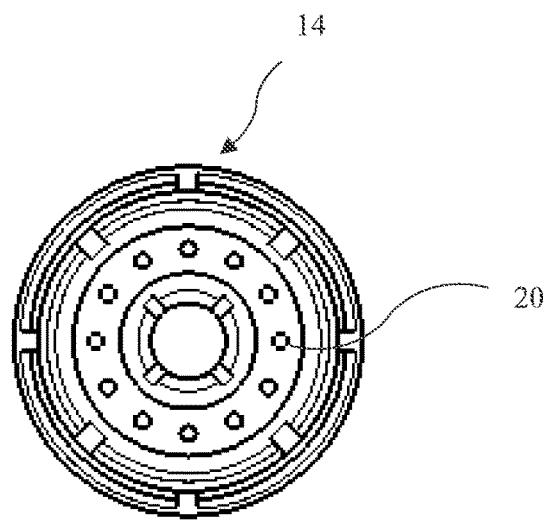
FIG. 9B shows a top view of the bottom plug according to the present invention.
Figure 9A:
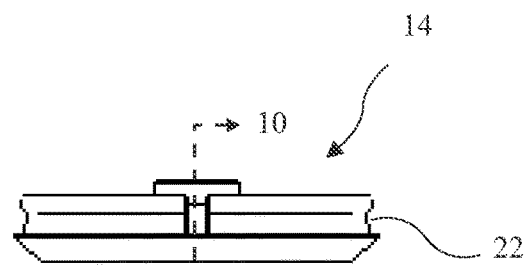
FIG. 9A shows a side view of a bottom plug according to the present invention.
Figure 10:
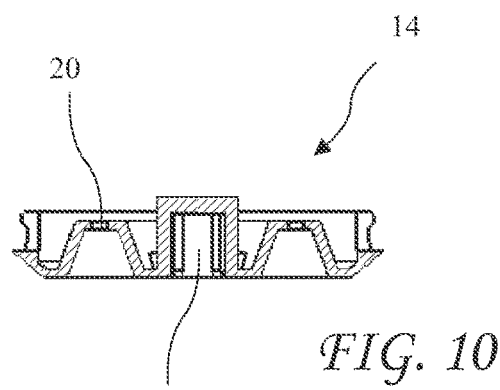
FIG. 10 shows a cross-sectional view of the bottom plug according to the present invention taken along line 10-10 of FIG. 9A.
Figure 9C:
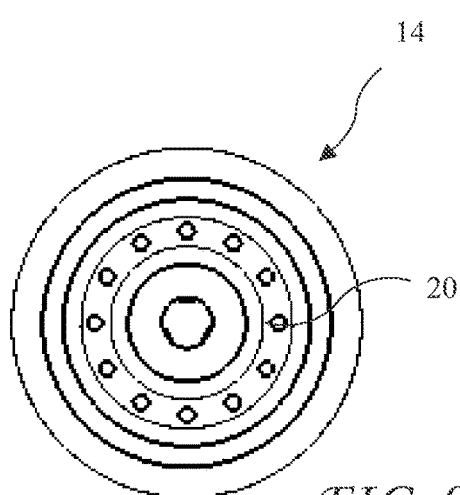
FIG. 9C shows a bottom view of the bottom plug according to the present invention.
Figure 11:
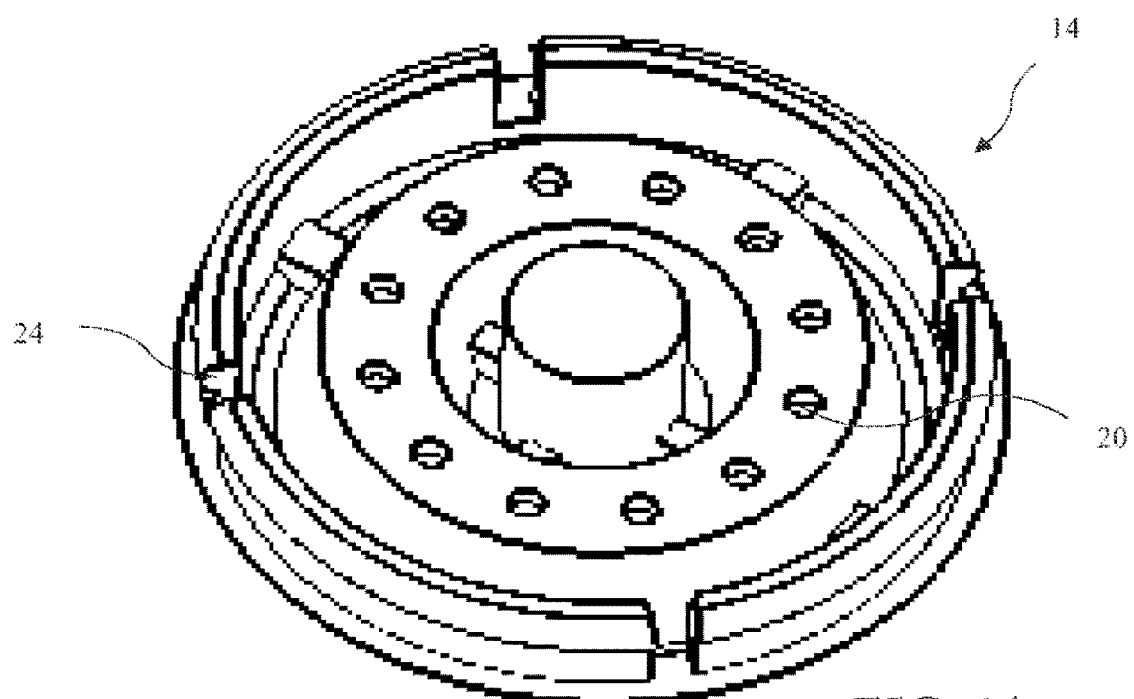
FIG. 11 shows a detailed top isometric view of the bottom plug according to the present invention.
Figure 12:
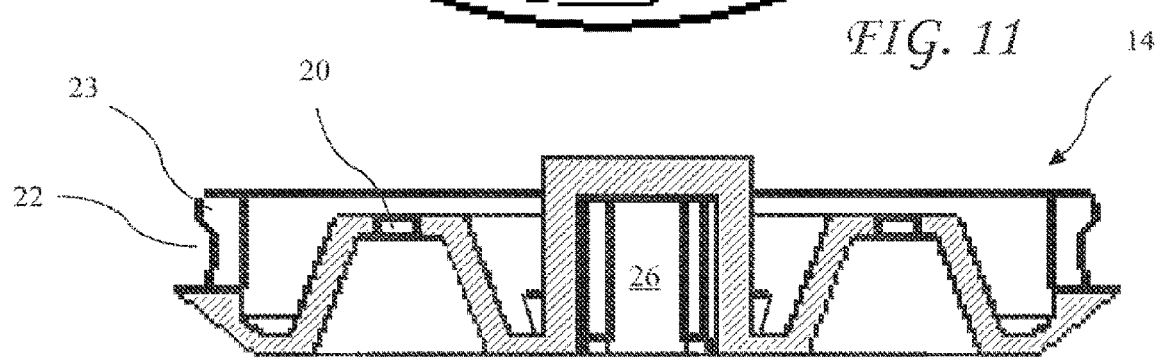
FIG. 12 shows a detailed cross-sectional view of the bottom plug according to the present invention taken along line 10-10 of FIG. 9A.
Figure 13:
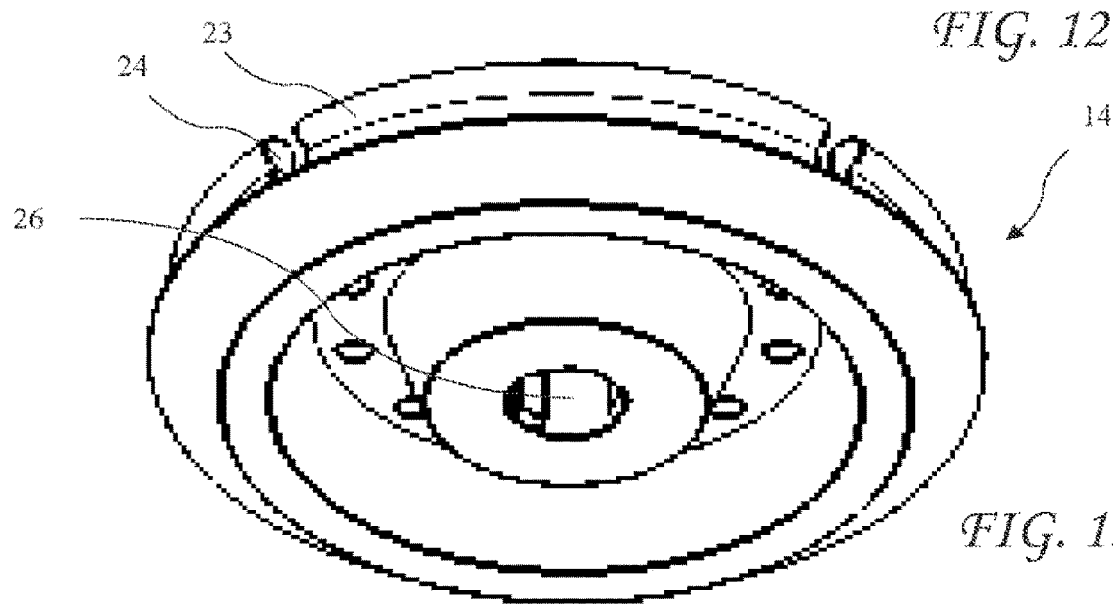
FIG. 13 shows a detailed bottom isometric view of the bottom plug according to the present invention.
Figure 14A:
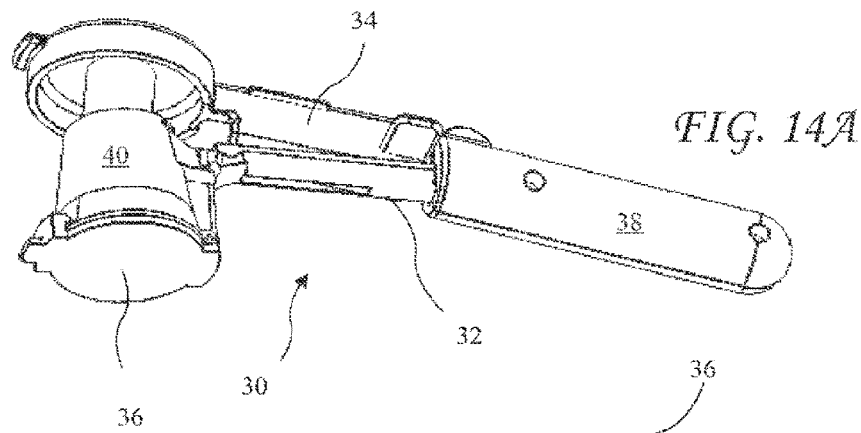
FIG. 14A shows a first isometric view of a hand held tool according to the present invention.
Figure 14B:
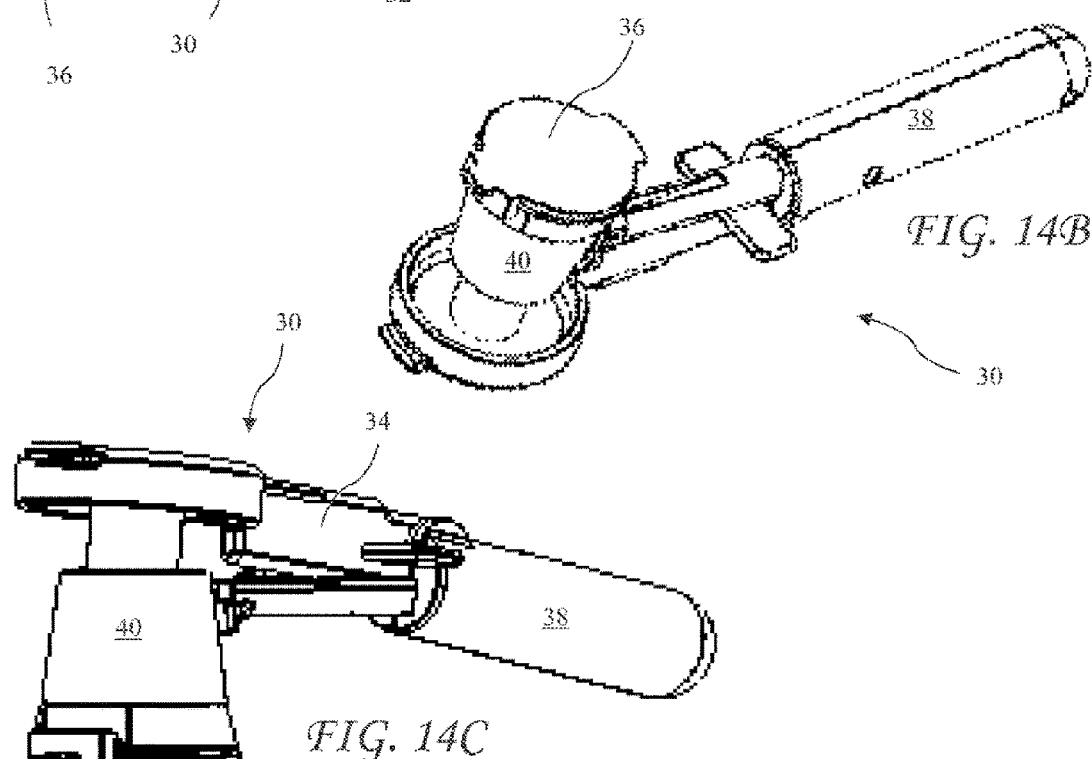
FIG. 14B shows a second isometric view of the hand held tool according to the present invention.
Figure 14C:
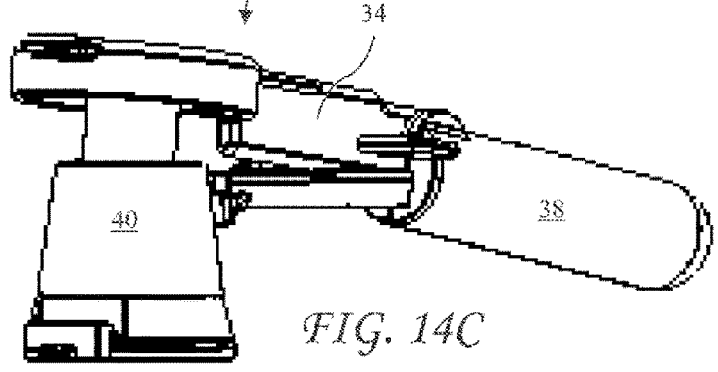
FIG. 14C shows a third isometric view of the hand held tool according to the present invention.
Figure 14D:
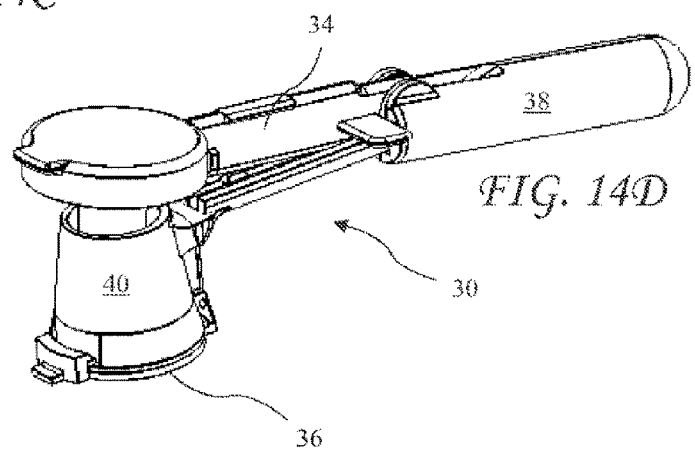
FIG. 14D shows a fourth isometric view of the hand held tool according to the present invention.

FIG. 9A shows a side view of a bottom plug 14, FIG. 9B shows a top view of the bottom plug 14, FIG. 9C shows a bottom view of the bottom plug 14, and FIG. 10 shows a cross-sectional view of the bottom plug 14 taken along line 10-10 of FIG. 9A. Further, FIG. 11 shows a detailed top isometric view of the bottom plug, FIG. 12 shows a detailed cross-sectional view of the bottom plug taken along line 10-10 of FIG. 9A, and FIG. 13 shows a detailed bottom isometric view of the bottom plug according to the present invention. The bottom plug 14 defines the exterior annular recess 22 created by a lip 23 above the exterior annular recess 22. The lip 23 includes gaps 24 allowing the lip 24 to slightly distort when the bottom plug 14 is pressed into the open base bottom 12b. The bottom plug 14 further includes ports or weakened areas 20. When espresso is brewed, the brewed beverage escapes from the cartridge 10 through the ports or weakened areas 20. The weakened area 20 help seal the cartridge 10 before use. The bottom plug 14 further may include a guide hole 26. The guide hole 26 engages a guide hole pin 52 (see FIG. 17A) to hold the bottom plug during assembly of the cartridge 10.

FIGS. 14A-14D show isometric views of a hand held tool 30. The tool 30 includes a frame 32, a handle 38 attached to the frame 32 for grasping by a user, a cartridge holder 40, a cartridge hole lid 36, and a tamper/seater 34. The cartridge base 12 is held in the cartridge holder 40 to fill, tamp, and plug the cartridge 12 to construct an espresso cartridge 10.

Figure 15:
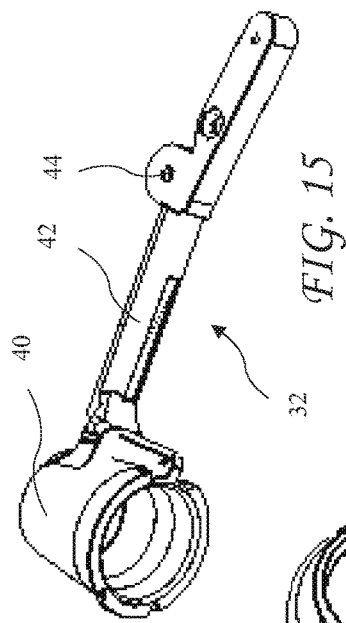
FIG. 15 shows an isometric view of a frame of the hand held tool according to the present invention.
Figure 16E:
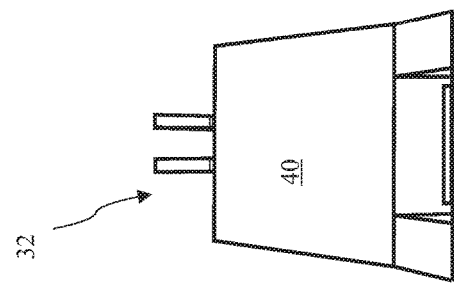
FIG. 16E shows a front view of the frame of the hand held tool according to the present invention.
Figure 16B:
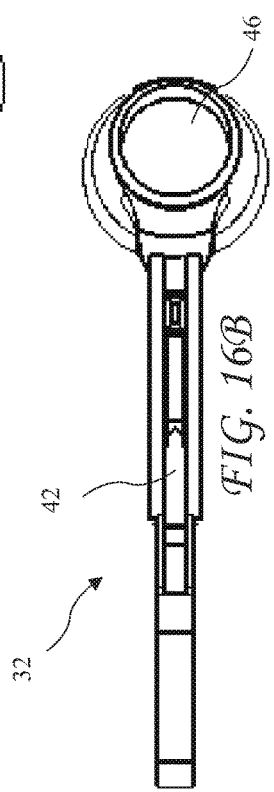
FIG. 16B shows a top view of the frame of the hand held tool according to the present invention.
Figure 16A:
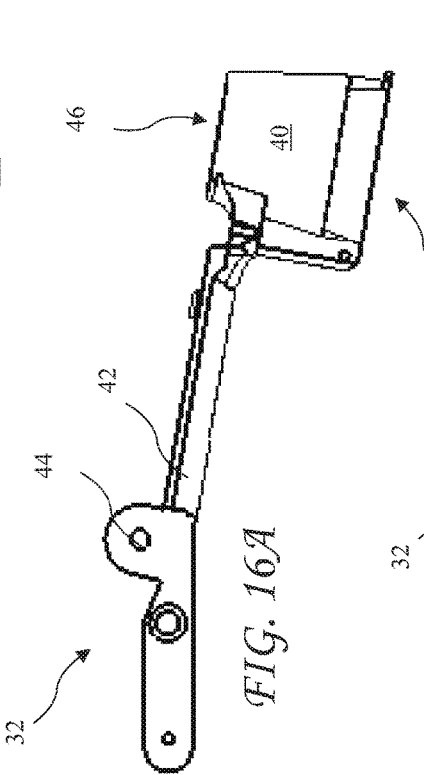
FIG. 16A shows a side view of the frame of the hand held tool according to the present invention.
Figure 16C:
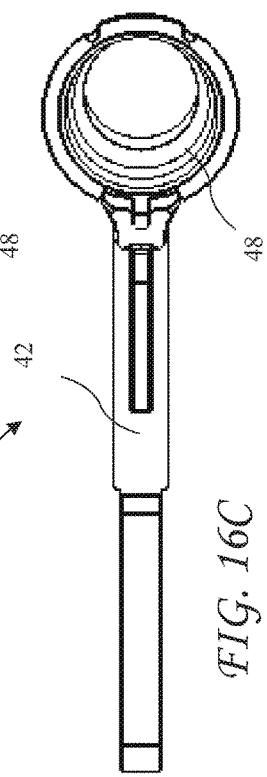
FIG. 16C shows a bottom view of the frame of the hand held tool according to the present invention.
Figure 16D:
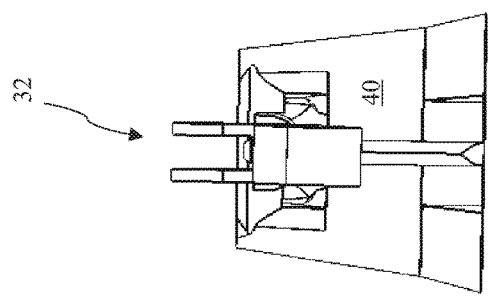
FIG. 16D shows a rear view of the frame of the hand held tool according to the present invention.

FIG. 15 shows an isometric view of the frame 32 of the hand held tool 30, FIG. 16A shows a side view of the frame 32 of the hand held tool 30, FIG. 16B shows a top view of frame 32 of the hand held tool 30, FIG. 16C shows a bottom view of frame 32 of the hand held tool 30, FIG. 16D shows a rear view of the frame of frame 32 of the hand held tool 30, and FIG. 16E shows a front view of the frame of frame 32 of the hand held tool 30. The frame 32 includes the cartridge holder 40, an arm 42 expending from the cartridge holder 40 to the handle 38, and pivot hands 44. The cartridge holder 40 has an open scoop mouth 46 and an open cartridge mouth 48, which may be closed by the lid 36 after placing the cartridge base 12 in the cartridge holder 40. The cartridge holder 40 may have a cylindrical or a frustoconical exterior, but preferably has a frustoconical interior matching the walls 12c of the cartridge base 12.

FIG. 17A shows a first isometric view of the tamper/seater 34 of the hand held tool 30, FIG. 17B shows a second isometric view of the tamper/seater 34 of the hand held tool 30, FIG. 18A shows a side view of the tamper/seater 34 of the hand held tool 30, and FIG. 18B shows a rear view of the tamper/seater 34 of the hand held tool 30. The tamper/seater 34 provide two steps of making the espresso cartridge 10. A pivot 60 cooperates with the pivot hands 44 of the frame 32 allowing the tamper/seater 34 to pivot towards and away from the cartridge holder 40. A tamping plunger 50 is pushed into the cartridge holder 40 to tamp brewing material in the cartridge base 12. After tamping, the tamping plunger 50 is used to press the bottom plug 14 into the cartridge base 12. The tamping plunger 50 may include the guide hole pin 52 to attach the bottom plug 14 to the tamping plunger 50 to hold the bottom plug 14 aligned with the cartridge base bottom 12b while pressing the bottom plug 14 into the cartridge base bottom 12b. The tamper/seater 34 may include wings 58 facilitating one handed operation of the tool 30. A tamper arm 56 connects the pivot 60 to the tamper plunger 50.

Figure 19A:
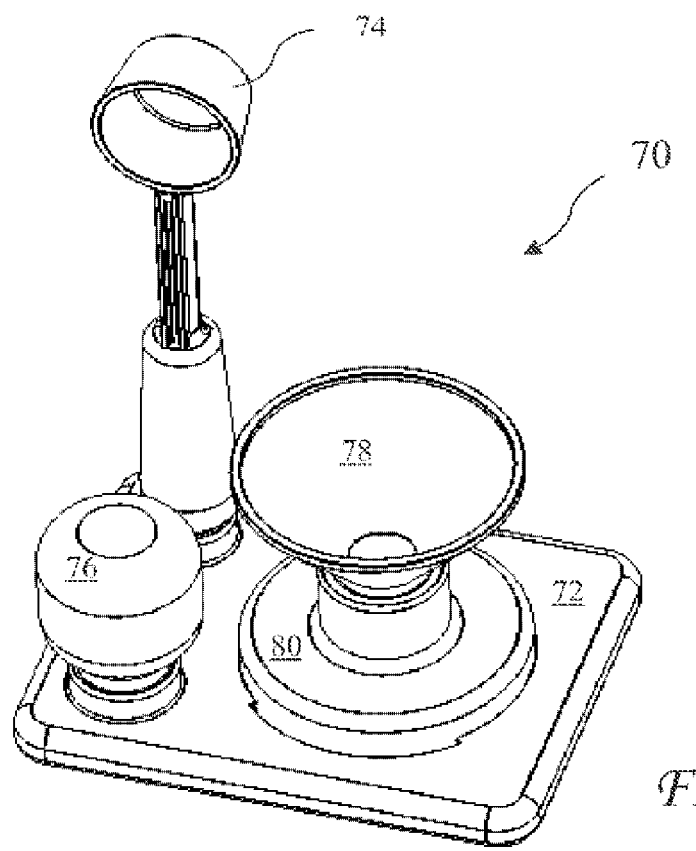
FIG. 19A shows a first isometric view of a counter top tool according to the present invention.
Figure 19B:
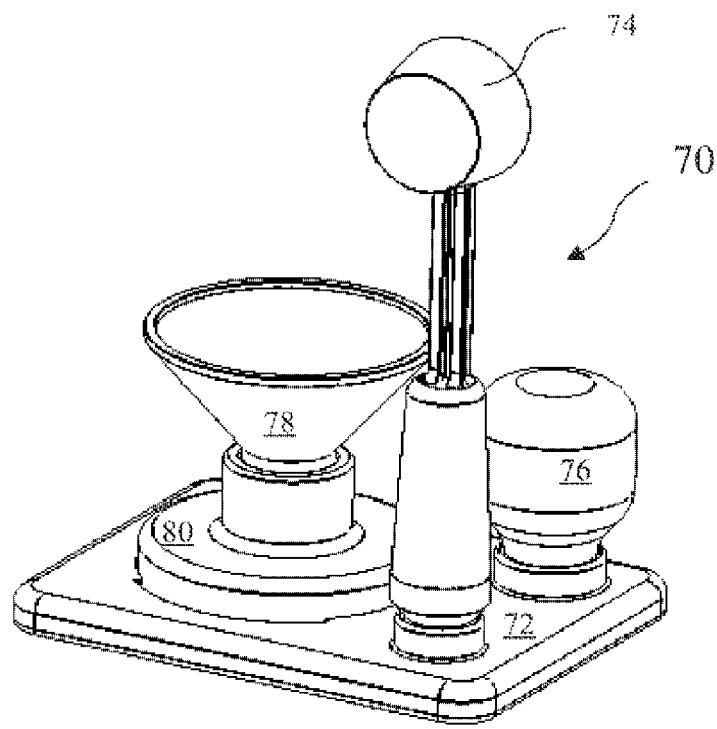
FIG. 19B shows a second isometric view of the counter top tool according to the present invention.

FIG. 19A shows a first isometric view of a counter top tool 70 and FIG. 19B shows a second isometric view of the counter top tool 70. The counter top tool includes a tool base 72, a cartridge lock 80 which retains the cartridge base 12 on the tool base 72, a funnel 78 for filling the cartridge base 12, a scoop and tamper 74 for measuring and pouring brewing material, and a seating tool 76 for seating the bottom plug after filling the cartridge base 12 with the brewing material.

Figure 20A:
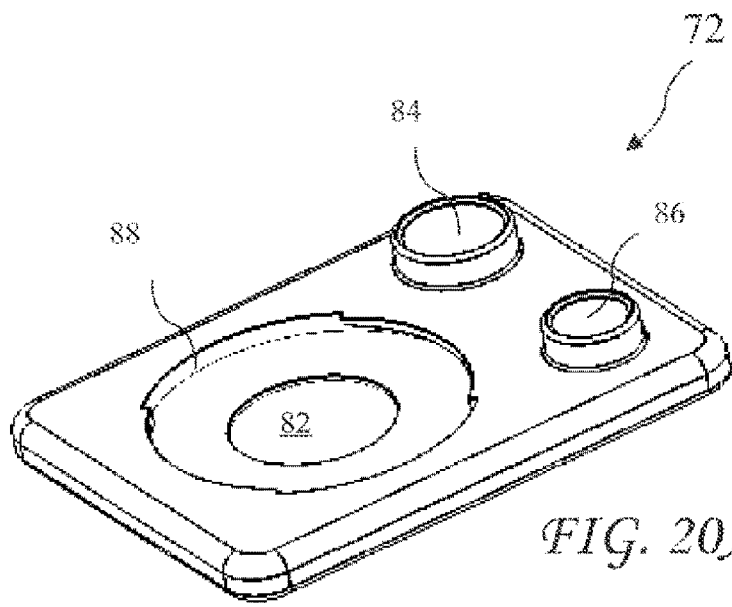
FIG. 20A shows a tool base of the counter top tool according to the present invention.
Figure 20B:
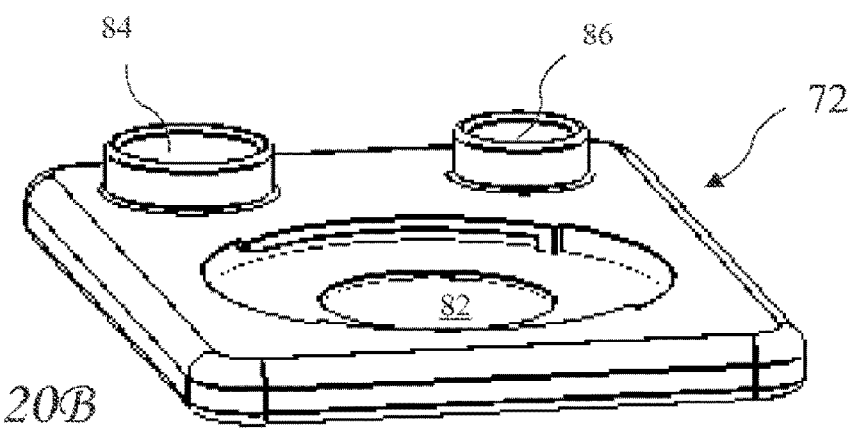
FIG. 20B shows a second view of the tool base of the counter top tool according to the present invention
Figure 20C:
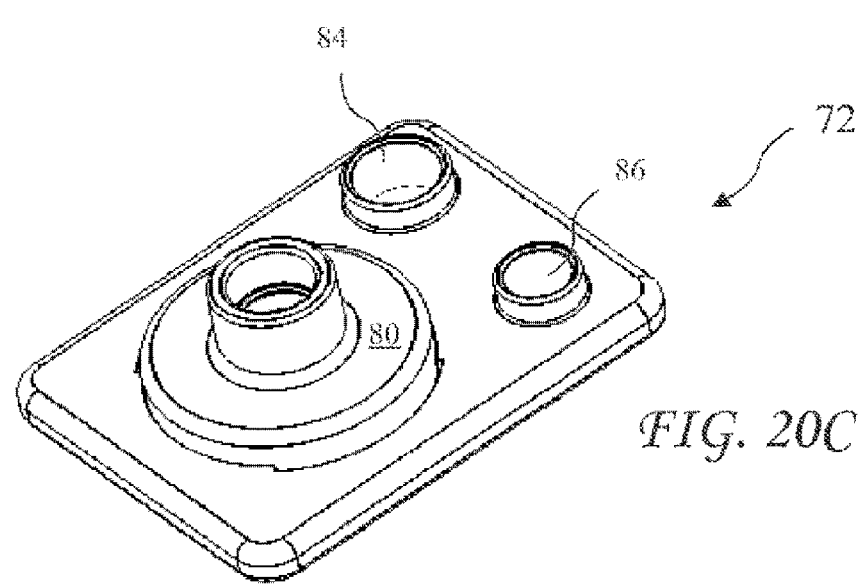
FIG. 20C shows a tool base of the counter top tool according to the present invention with a cartridge lock according to the present invention attached to the tool base.

FIG. 20A shows the tool base 72 of the counter top tool 70, FIG. 20B shows a second view of the tool base 72 of the counter top tool 70, and FIG. 20C shows a tool base 72 of the counter top tool 70. The tool base 72 includes a cartridge seat 82 a slightly larger than the cartridge top 12a to position the cartridge 12 on the tool base 72. Locking recesses 88 are formed around the cartridge seat 82 to attach a cartridge lock 80 (see FIGS. 22-24) to the tool base 72 to hold the cartridge base 12 on the tool base 71. A recess 84 is formed on the tool base 72 to position or store the seating tool 76 when not in use and a recess 86 is formed to position or store the scoop and tam per 74 when not in use.

Figure 21C:
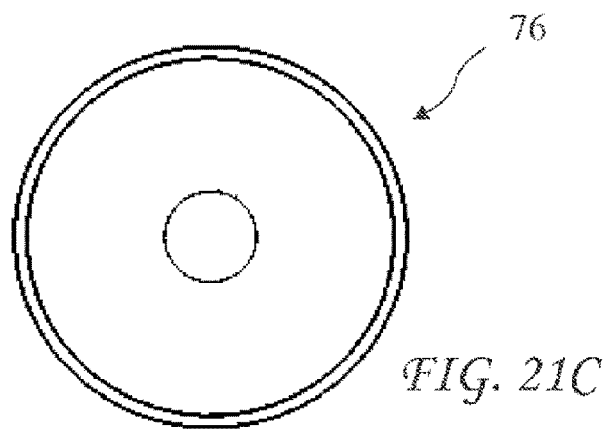
FIG. 21C shows a top view of the funnel according to the present invention.
Figure 21A:
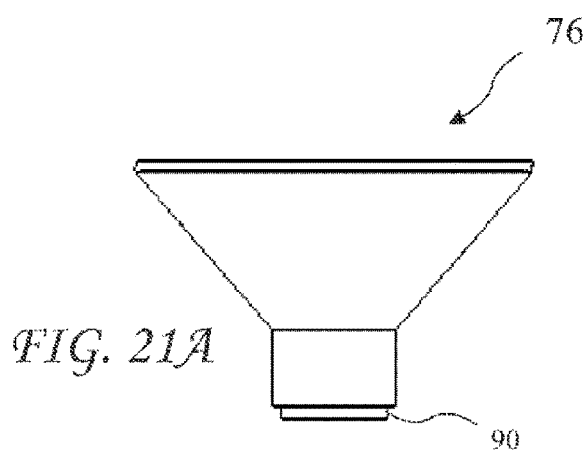
FIG. 21A shows a side view of a funnel according to the present invention.
Figure 21B:
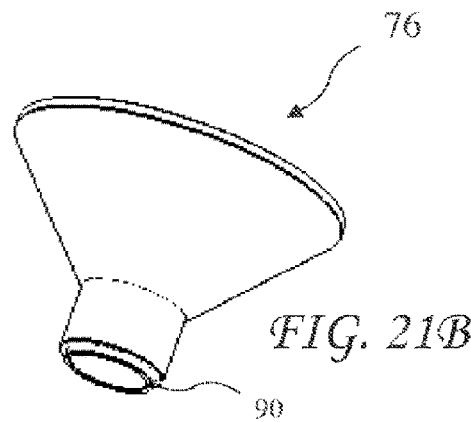
FIG. 21B shows an isometric view of the funnel according to the present invention.
Figure 21D:
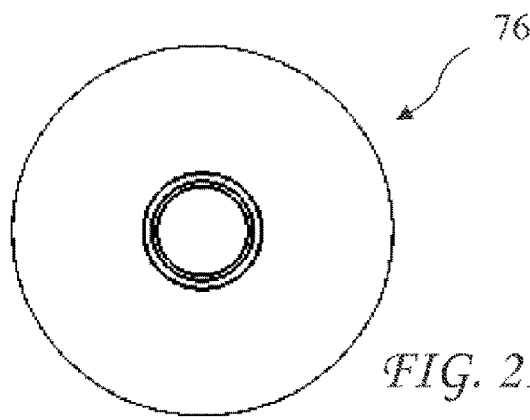
FIG. 21D shows a bottom view of the funnel according to the present invention.

FIG. 21A shows a side view of the funnel 76, FIG. 21B shows an isometric view of the funnel 76, FIG. 21C shows a top view of the funnel 76, and FIG. 21D shows a bottom view of the funnel 76. The funnel 76 fits into a cylindrical access mouth 94 (see FIG. 24) of the cartridge lock 80. The funnel 76 may include a step 90 to align the funnel with the open base bottom 12b, or may be tapered to align the funnel with the open base bottom 12b.

FIG. 22 shows an isometric view of the cartridge lock 80, FIG. 23A shows a side view of the cartridge lock 80, FIG. 23B shows a side view of the cartridge lock 80, FIG. 23C shows a top view of the cartridge lock 80, FIG. 23D shows a bottom view of the cartridge lock 80, and FIG. 24 shows a cross-sectional view of the cartridge lock 80, taken along line 24-24 of FIG. 23C. The cartridge lock 80 includes locking ring segments 92 which engage the locking recesses 88 of the tool base 72 to retain the cartridge lock 80 and the cartridge base 12 on the tool base 72. The cartridge lock 80 includes a frustoconical shaped interior 95 positioning the cartridge base in the cartridge lock 80 for filling, tamping, and seating the bottom plug 14.

Figure 25A:
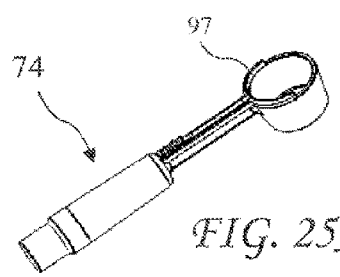
FIG. 25A shows a scoop and tamper tool according to the present invention with a leveling fork according to the present invention retracted.
Figure 25B:
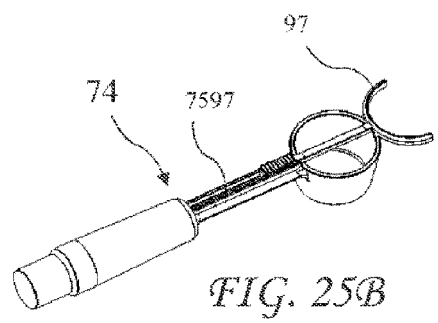
FIG. 25B shows the scoop and tamper tool according to the present invention with the leveling fork according to the present invention extended.
Figure 26:
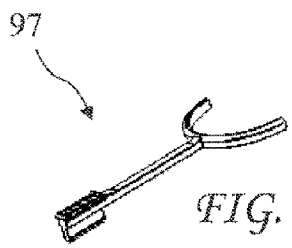
FIG. 26 shows an isometric view of the leveling fork according to the present invention.

FIG. 25A shows the scoop and tamper tool 74 with a leveling fork 97 retracted, FIG. 25B shows the scoop and tamper tool 74 with the leveling fork 97 extended, FIG. 26 shows an isometric view of the leveling fork 97. The leveling fork 97 is restrained to slide in a slot 75 in the scoop and tam per tool 74. After scooping a portion of brewing material 11 (see FIG. 4), the leveling fork 97 may be guided forward to push excess brewing material off the scoop and tamper tool 74 to obtain a consistent amount of brewing material 11.

The scoop and tamper tool 74 includes a cylindrical tamper 98 and a flat tamping end 51 opposite to the scoop 96. The cylindrical tamper 98 is slightly smaller in diameter than the cylindrical access mouth 94 of the cartridge lock 80 to allow the cylindrical tamper 98 to pass through the cylindrical mouth 94 during tamping.

Figure 27B:
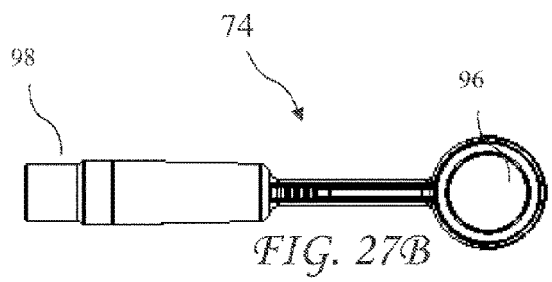
FIG. 27B shows a top view of the scoop and tamper tool according to the present invention with the leveling fork according to the present invention retracted.
Figure 28B:
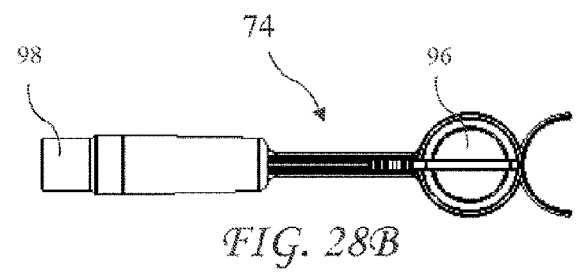
FIG. 28B shows a top view of the scoop and tamper tool according to the present invention with the leveling fork according to the present invention extended.
Figure 27A:
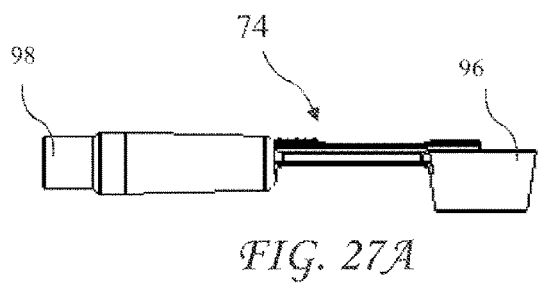
FIG. 27A shows a side view of the scoop and tamper tool according to the present invention with the leveling fork according to the present invention retracted.
Figure 28A:
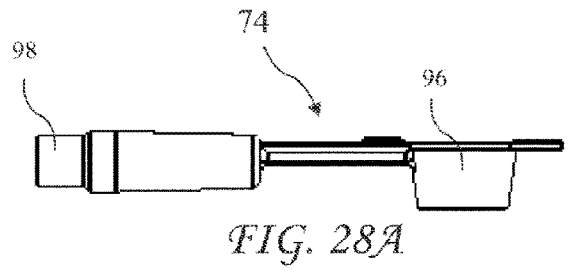
FIG. 28A shows a side view of the scoop and tamper tool according to the present invention with the leveling fork according to the present invention extended.

FIG. 27A shows a side view of the scoop and tamper tool 74 with the leveling fork 97 retracted, FIG. 27B shows a top view of the scoop and tamper tool 74 with the leveling fork 97 retracted, FIG. 28A shows a side view of the scoop and tamper tool 74 with the leveling fork 97 extended, and FIG. 28B shows a top view of the scoop and tamper tool 74 with the leveling fork 97 extended.

Figure 29:
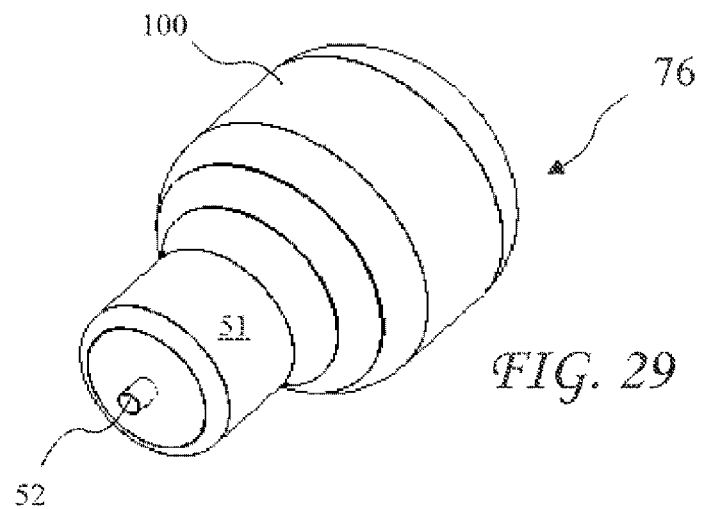
FIG. 29 shows an isometric view of a seating tool according to the present invention.
Figure 30A:
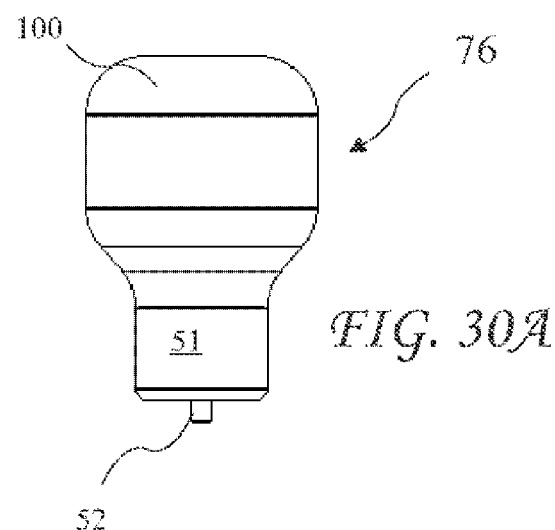
FIG. 30A shows a side view of the seating tool according to the present invention.
Figure 30B:
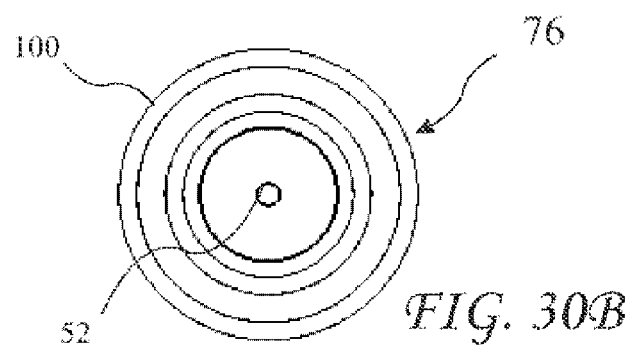
FIG. 30B shows a bottom view of the seating tool according to the present invention.

FIG. 29 shows an isometric view of the seating tool 76, FIG. 30A shows a side view of the seating tool 76, and FIG. 30B shows a bottom view of the seating tool 76. The seating tool 76 includes a cylindrical portion 51 extending from a grasping portion 100. The grasping portion 100 facilitated applying a force required to seat the bottom plug 14 in the open cartridge bottom 12b. A guide hole pin 52 to attach the bottom plug 14 to the seating tool 76 to hold the bottom plug 14 aligned with the cartridge base bottom 12b while pressing the bottom plug 14 into the cartridge base bottom 12b.

Figure 31:
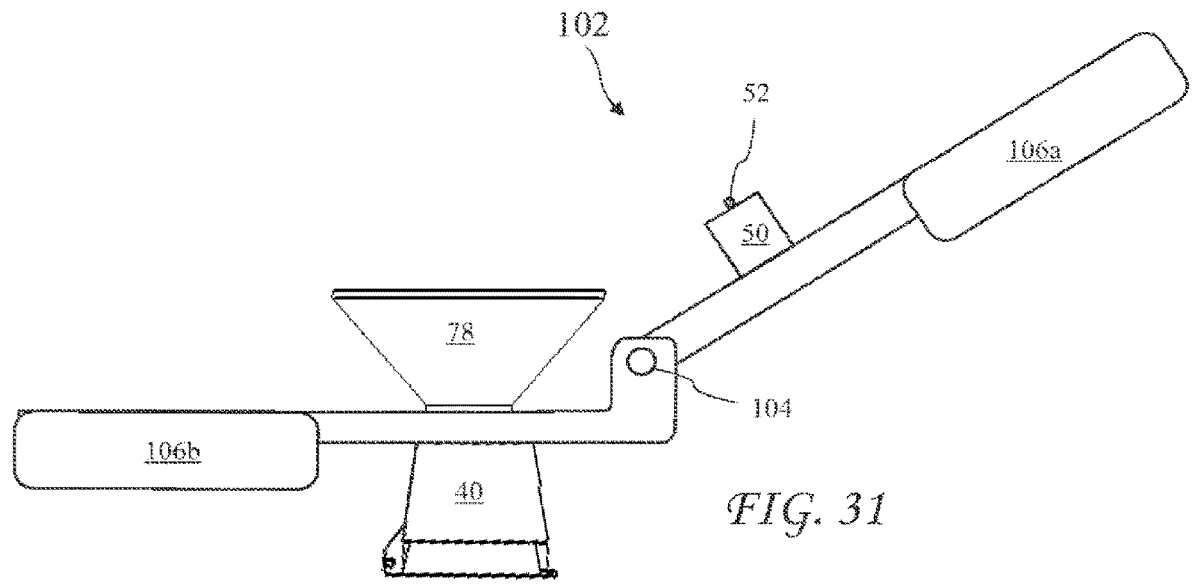
FIG. 31 shows a side view of a second hand held tool according to the present invention in an open state.
Figure 32:
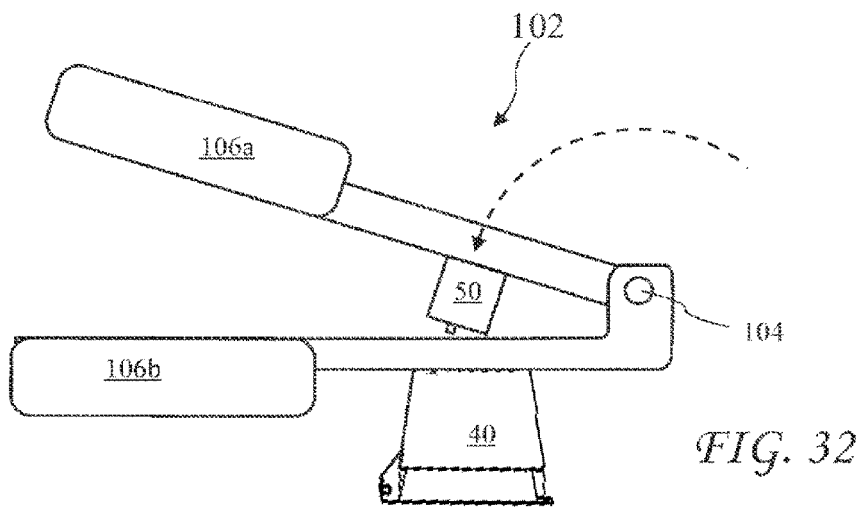
FIG. 32 shows a side view of the second hand held tool according to the present invention in a closing state.

FIG. 31 shows a side view of a second hand held tool 102 in an open state and FIG. 32 shows a side view of the second hand held tool 102 in a closing state. The tool 102 includes a pivot 104 and handles 106a and 106b. The cartridge holder 40 is fixed to one handle 106b, and the tam per plunger 50 is attached to the handle 106a. The cartridge base 12 may be filled using the scoop and tamper 74 as described for the tool 70 above, and the handle 106a may be pivoted to first tamp the brewing material using the tamper plunger 50, and then to seat the bottom plug 14 using the tamper plunger 50, as described for the tool 30 above. The tool 102 advantageously provides leverage during tamping and seating, easing the use of the tool.

Figure 33:
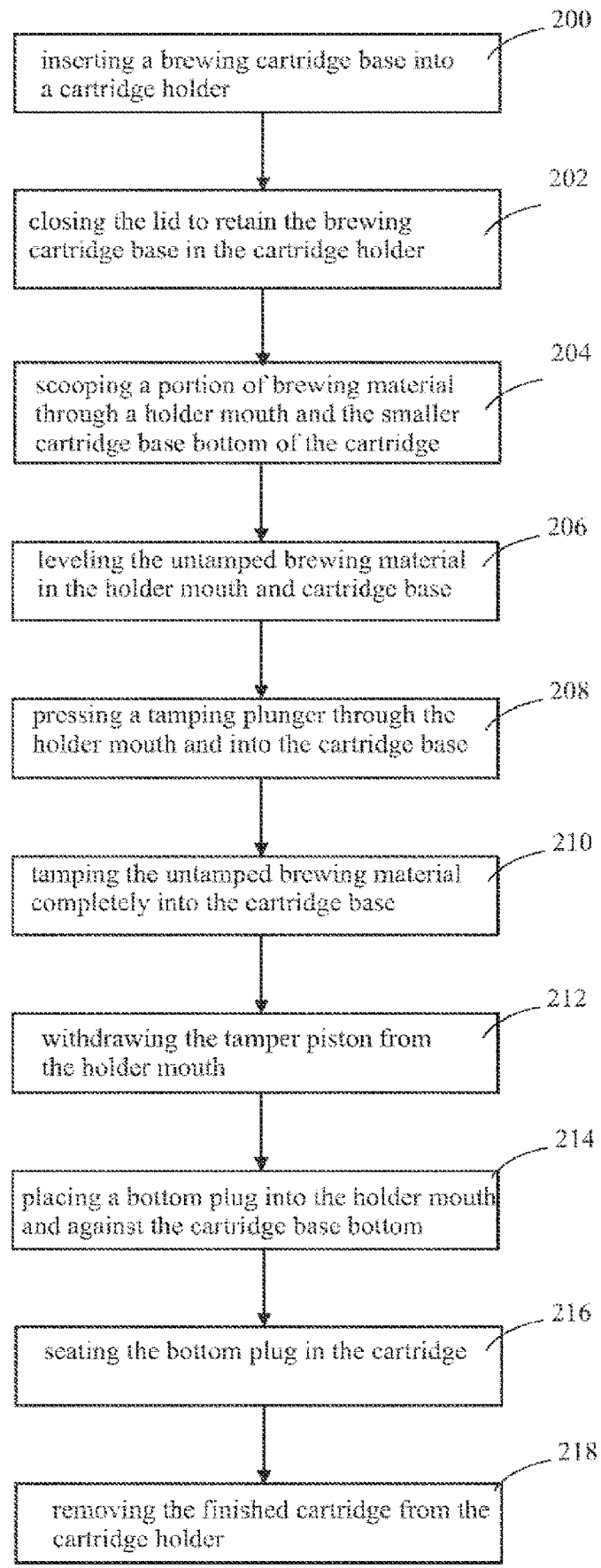
FIG. 33 shows a method according to the present invention for using the hand held tool.

FIG. 33 shows a method according to the present invention for using the hand held tool. The method includes inserting a frustoconical shaped cartridge base into a cartridge holder, an open cartridge base bottom first into the cartridge holder, the cartridge base bottom diameter smaller than a cartridge base top opposite to the cartridge base bottom at step 200, closing a lid to retain the cartridge base in the cartridge holder at step 202, scooping a portion of untamped brewing material through a holder mouth and the smaller cartridge base bottom of the cartridge at step 204, leveling the untamped brewing material in the holder mouth and cartridge base at step 206, pressing a tamping plunger through the holder mouth and into the cartridge holder at step 208, tamping the untamped brewing material completely into the cartridge base at step 210, withdrawing the tamper piston from the holder mouth at step 212, placing a bottom plug into the holder mouth and against the smaller cartridge base bottom of the cartridge base at step 214, seating the bottom plug in the smaller base bottom of the cartridge at step 216, and removing the finished cartridge from the cartridge holder at step 218.

Figure 34:
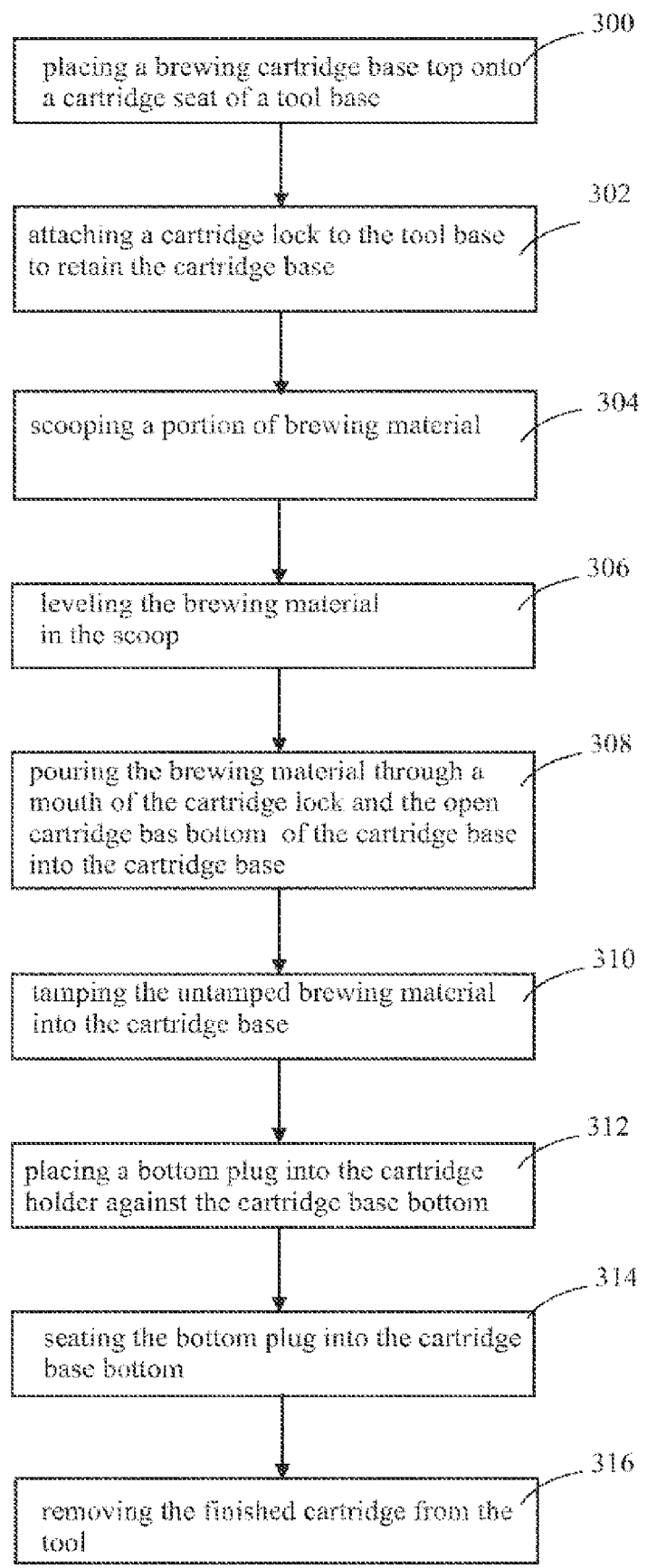
FIG. 34 shows a method according to the present invention for using the table top tool.

FIG. 34 shows a method according to the present invention for using the table top tool. The method includes the steps of placing a frustoconical shaped brewing cartridge base onto a cartridge seat of a tool base, a closed cartridge base top against the cartridge seat, the cartridge base top having a larger diameter than an open cartridge base bottom opposite the cartridge base top at step 302, attaching a cartridge lock to the tool base to retain the cartridge base against the tool base at step 302, scooping a portion of brewing material at step 304, leveling the brewing material in the scoop at step 306, pouring the brewing material through a mouth of the cartridge lock and the open bottom end of the cartridge base, into the cartridge base at step 308, tamping the untamped brewing material into the cartridge base at step 310, placing a bottom plug into the cartridge holder against the small end of the cartridge at step 312, seating the bottom plug into the cartridge base at step 314, and removing the finished cartridge from the tool at step 316.

Figure 35B:
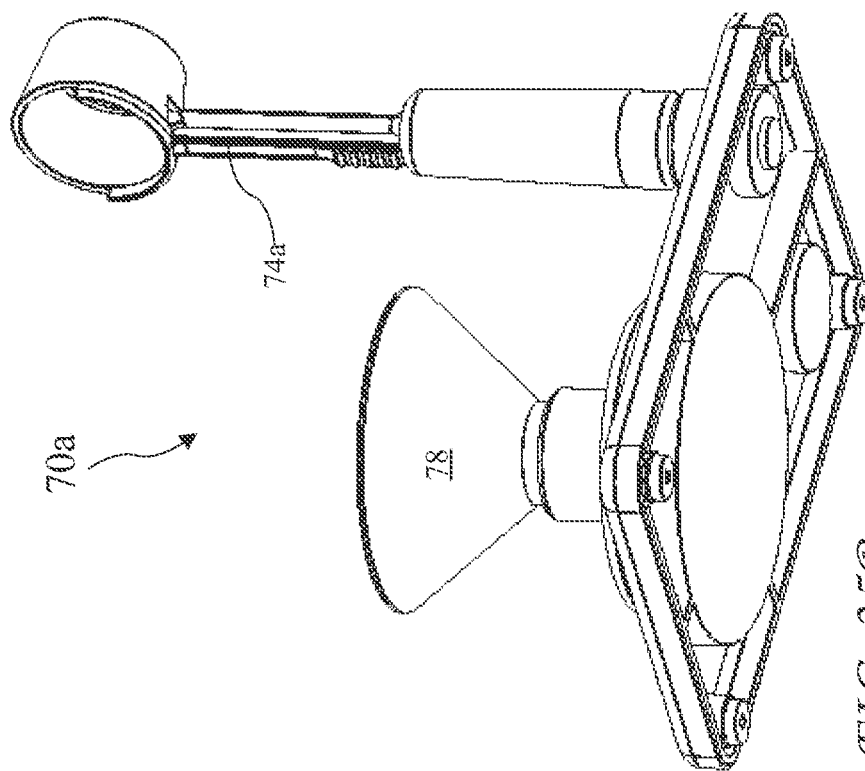
FIG. 35B shows a bottom/quarter isometric view of the second counter top tool according to the present invention.
Figure 35A:
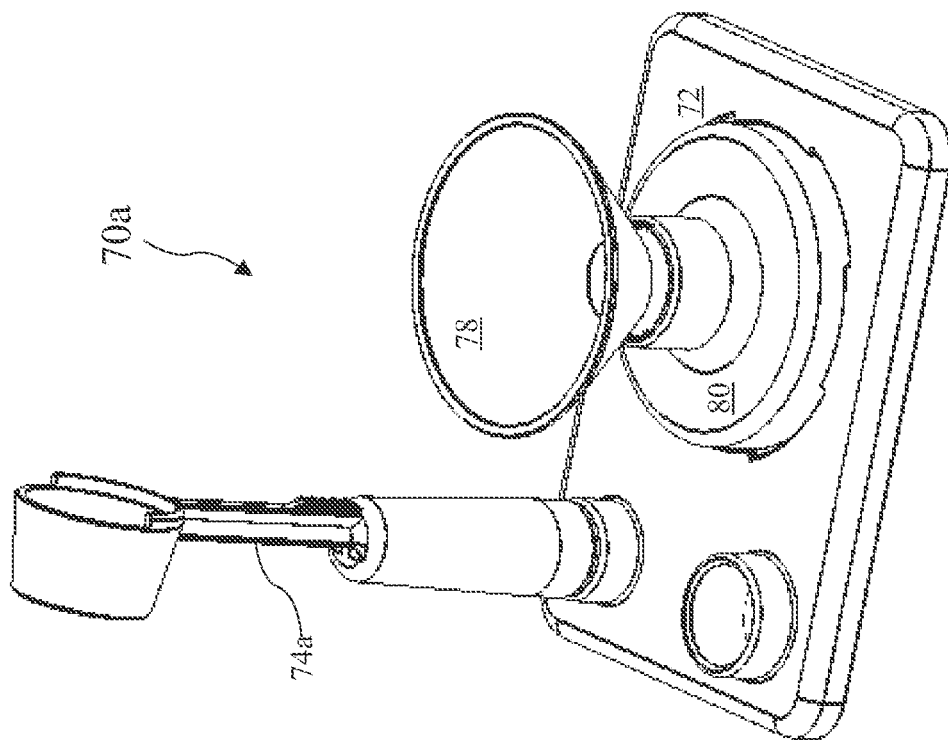
FIG. 35A shows a top/quarter isometric view of a second counter top tool according to the present invention.

A top/quarter isometric view of a second counter top tool 70*a* is shown in FIG. 35A and a bottom/quarter isometric view of the second counter top tool 70*a* is shown in FIG. 35B. The second counter top tool 70*a* includes a scoop/tamper/seating tool 74*a* replacing the scoop and tamper 74, and does not include the dedicated seating tool 76.

Figure 36A:
FIG. 36A shows a top/side isometric view of a scoop/tamper/seating tool according to the present invention.
Figure 36B:
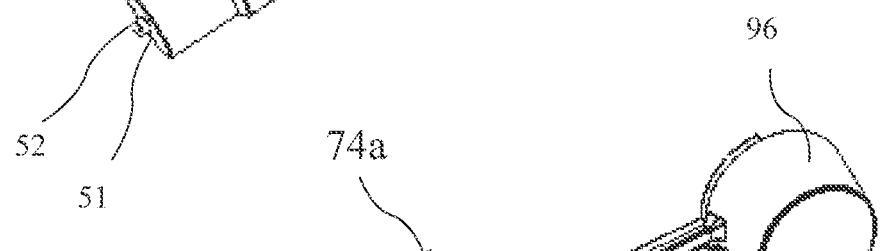
FIG. 36B shows a bottom/side isometric view of the scoop/tamper/seating tool according to the present invention.
Figure 36C:
FIG. 36C shows a top/rear isometric view of the scoop/tamper/seating tool according to the present invention.
Figure 36C:
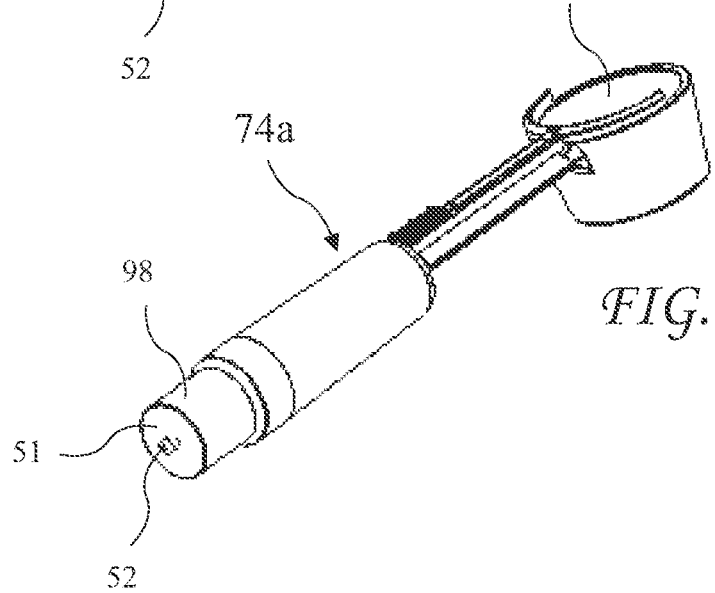

A top/side isometric view of the scoop/tamper/seating tool 74*a* is shown in FIG. 36A, a bottom/side isometric view of the scoop/tamper/seating tool 74*a* is shown in FIG. 36, and a top/rear isometric view of the scoop/tamper/seating tool 74*a* is shown in FIG. 36C. The scoop/tamper/seating tool 74*a* is similar to the scoop and tamper 76, but includes a flat end 51 opposite to the scoop 96, and a guide hole pin 52 centered on the flat end 51.

Figure 37A:
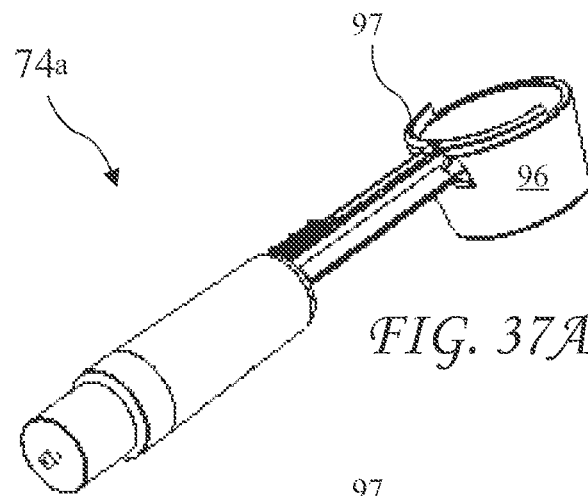
FIG. 37A shows a top/rear isometric view of the scoop/tamper/seating tool according to the present invention with a sliding level retracted.
Figure 37B:
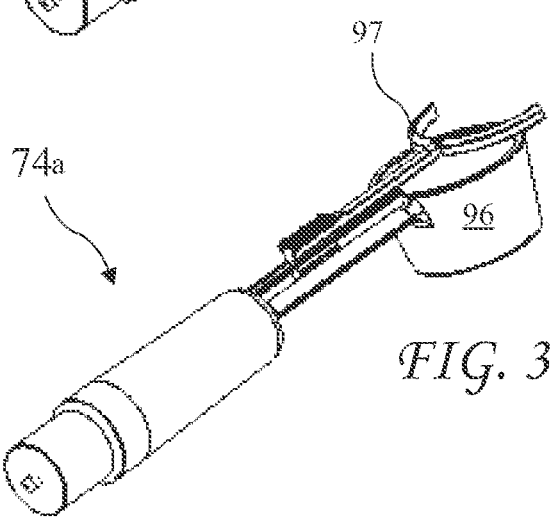
FIG. 37B shows a top/rear isometric view of the scoop/tamper/seating tool according to the present invention with the sliding level partially extended.
Figure 37C:
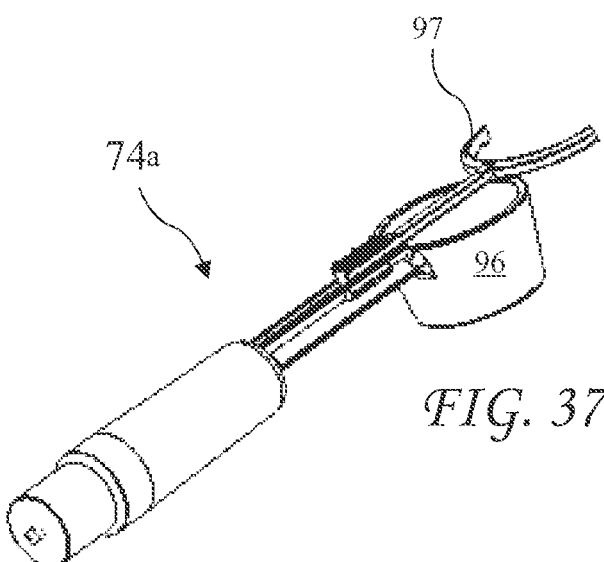
FIG. 37C shows a top/rear isometric view of the scoop/tamper/seating tool according to the present invention with the sliding level fully extended.

A top/rear isometric view of the scoop/tamper/seating tool 74*a* with a sliding level 97 retracted is shown in FIG. 37A, a top/rear isometric view of the scoop/tamper/seating tool 74*a* with the sliding level 97 partially extended is shown in FIG. 37B, and a top/rear isometric view of the scoop/tamper/seating tool 74*a* with the sliding level 97 fully extended is shown in FIG. 37C. After scooping brewing material from a bulk brewing material container, the sliding level may be used to level the brewing material to obtain a preferred amount of brewing material for an espresso cartridge. While sliding level 97 is shown in FIGS. 37A-37C, a pivoting level may also be used, and any apparatus usable to slide over the scoop 96 to level the brewing material is intended to come within the scope of the present invention.

Figure 38:
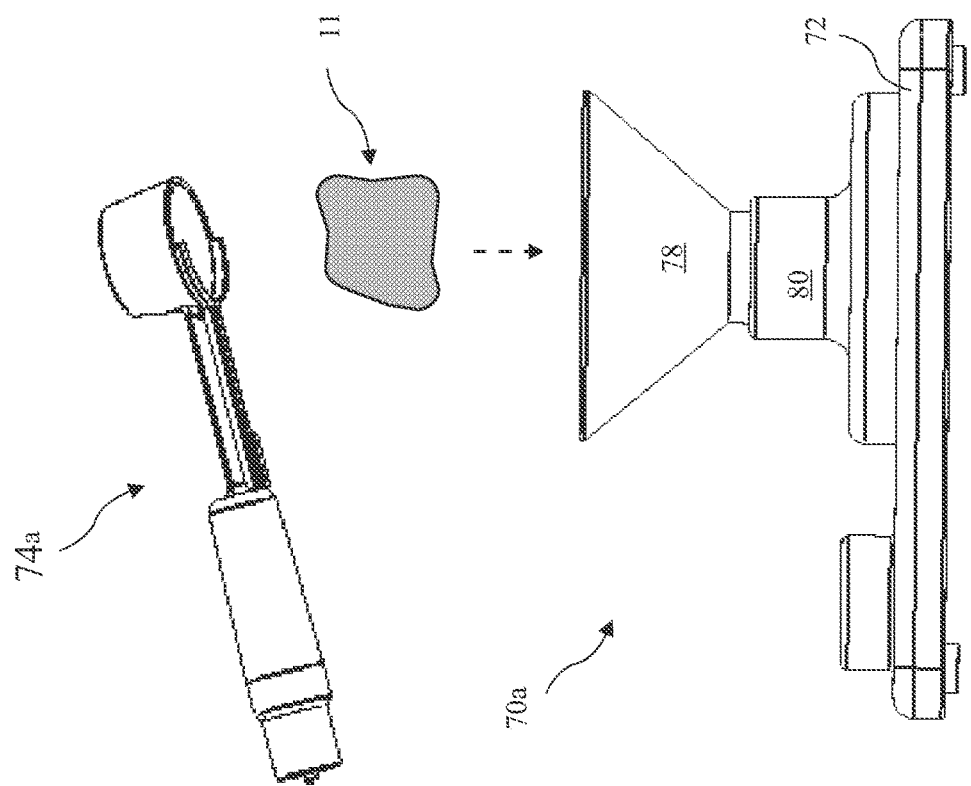
FIG. 38 shows the scoop/tamper/seating tool according to the present invention releasing brewing material into the espresso cartridge retained in the tool base.
Figure 40:
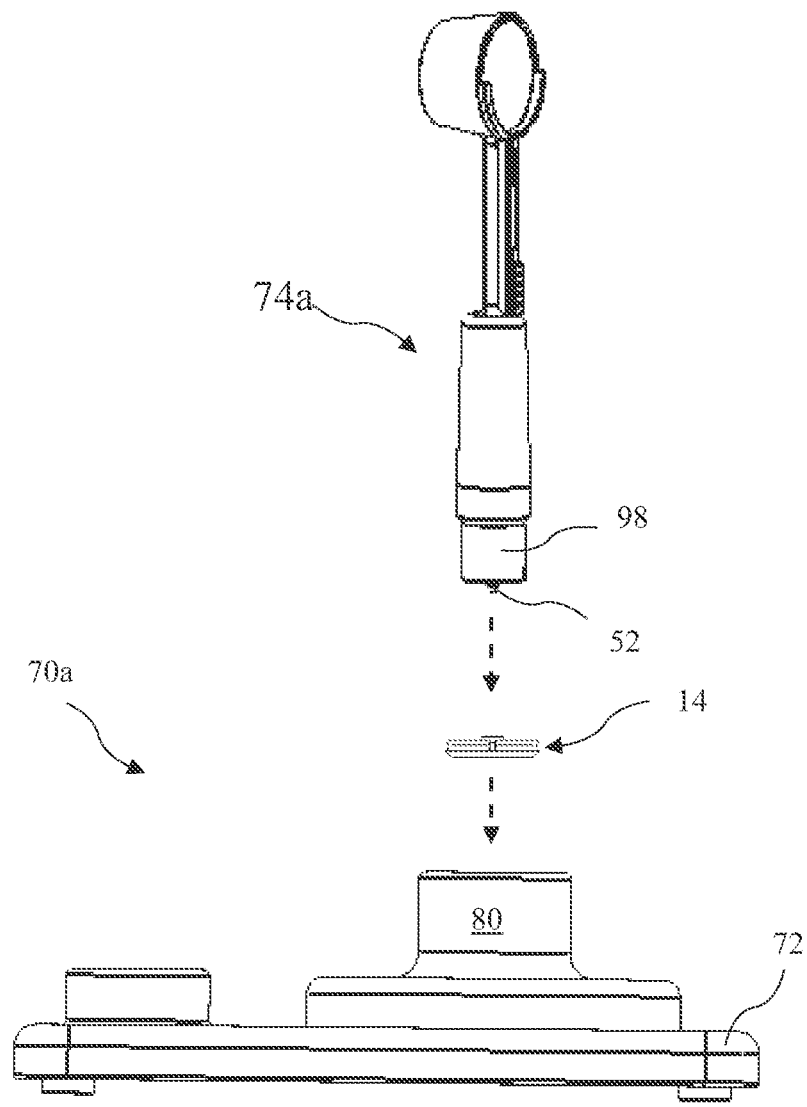
FIG. 40 shows the scoop/tamper/seating tool according to the present invention positioned to seat the bottom plug in the espresso cartridge retained in the tool base.

The scoop/tamper/seating tool 74*a* is shown releasing brewing material 11 into the espresso cartridge retained in the tool base in FIG. 38. The funnel 78 is fitted to the cartridge lock to guide the brewing material 11 into the cartridge 10 (see FIGS. 1-8) locked to the tool base 72.

Figure 39:
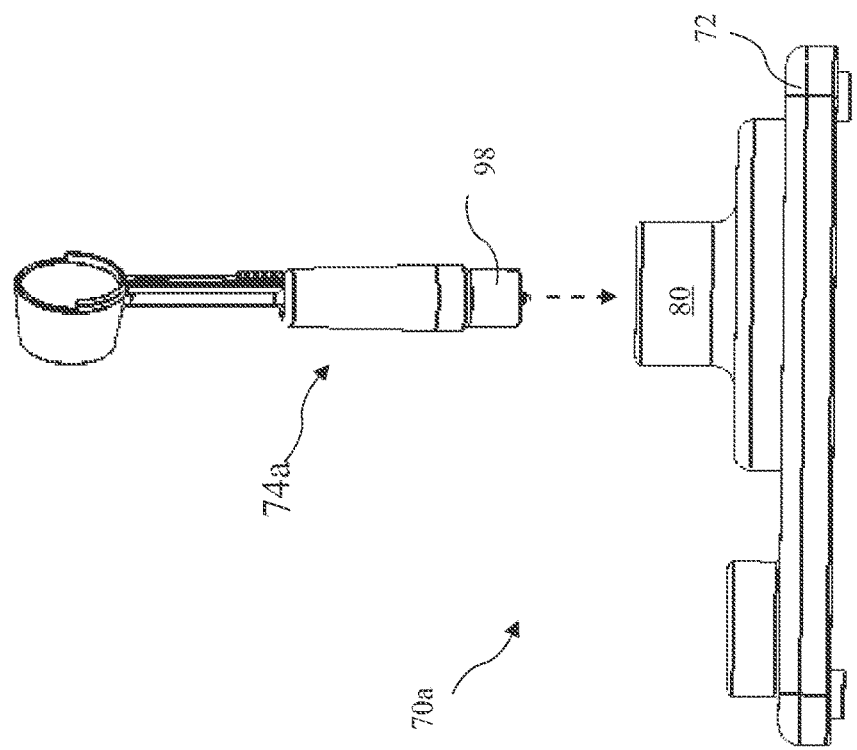
FIG. 39 shows the scoop/tamper/seating tool according to the present invention positioned to tamp the brewing material in the espresso cartridge retained in the tool base.

The scoop/tamper/seating tool 74*a* positioned to tamp the brewing material 11 in the espresso cartridge 10 retained in the tool base 72 in FIG. 39. The scoop/tamper/seating tool 74*a* includes a cylindrical tamper portion 98 slightly smaller than the cylindrical access mouth 94 (see FIG. 24) of the cartridge lock 80 to allow the cylindrical tamper portion 98 to enter the cartridge.

The scoop/tamper/seating tool 74*a* is shown positioned to seat the bottom plug 14 in the espresso cartridge 10 retained by the cartridge lock 80 in the tool base 72. The guide hole pin 52 engages the guide hole 21 of the bottom plug 14 and the cylindrical tamper portion 98 centers the bottom plug 14 for seating in the espresso cartridge 10.

The method of use of the second counter top tool 70*a* is described in FIG. 34.

While the invention herein disclosed has been described by means of specific embodiments and applications thereof, numerous modifications and variations could be made thereto by those skilled in the art without departing from the scope of the invention set forth in the claims.

I claim:

1. A method for constructing an espresso cartridge, the method comprising:

placing a frustoconical shaped brewing cartridge base onto a cartridge seat of a tool base, a closed cartridge base top against the cartridge seat, the cartridge base top having a larger diameter than an open cartridge base bottom opposite the cartridge base top;

attaching a cartridge lock to the tool base to retain the cartridge base against the tool base;

using a scoop end of a scoop/tamper/seating tool to scoop a portion of brewing material;

pouring the brewing material through a mouth of the cartridge lock and the open cartridge base bottom, into the cartridge base;

using a tamping end opposite to the scoop end of the scoop/tamper/seating tool to tamp the untamped brewing material into the cartridge base;

positioning a bottom plug above the cartridge base bottom and aligned with the cartridge base bottom;

using a tamping end opposite to the scoop end of the scoop/tamper/seating tool to seat the bottom plug into the open cartridge base bottom; and removing the finished cartridge from the tool.

2. The method of claim 1, further including after using the scoop end of the scoop/tamper/seating tool to scoop a portion of brewing material, leveling the brewing material to obtain a proper amount of brewing material for the espresso cartridge.

3. The method of claim 2, wherein leveling the brewing material comprises sliding a level across the scoop.

4. The method of claim 3, wherein sliding a level across the scoop comprises sliding a level retained to slide in a slot in the scoop/tam per/seating tool.

5. The method of claim 1, wherein aligning the bottom plug with the cartridge base bottom comprises:

engaging a guide hole of the bottom plug with a guide hole pin on the tamping end of the scoop/tamper/seating tool; and inserting the tamping end of the scoop/tamper/seating tool into an access mouth of the cartridge lock.

6. The method of claim 1, further including prior steps of:

obtaining a fillable espresso cartridge, the espresso cartridge comprising:

a cartridge base comprising:

frustoconical shaped walls;

a cartridge base top selected from a sealed top or a sealable top; and an open cartridge base bottom having a smaller diameter than the cartridge base top; and the bottom plug configured to insert into the open cartridge base bottom, the bottom plug configured to release brewed beverage through the bottom plug during brewing; and if unsealed, sealing the cartridge base top.

7. The method of claim 6, wherein the cartridge base top is sealed by foil.

8. The method of claim 6, further including foil and adhesive for attaching the foil to the cartridge base top to seal the cartridge base top.

9. The method of claim 6, wherein the bottom plug includes ports allowing the brewed beverage to release from the cartridge during brewing.

10. The method of claim 6, wherein the bottom plug includes weakened areas configured to burst during brewing allowing the brewed beverage to release from the cartridge during brewing.

11. The method of claim 6, wherein the bottom plug includes an annular recess and the open cartridge base bottom includes an interior annular ridge, and pressing the bottom plug into the open cartridge base bottom comprises engaging the interior annular ridge into the annular recess.

12. The method of claim 6, wherein the bottom plug includes a circumferential lip above the annular recess, and the circumferential lip includes gaps allowing the circumferential lip to collapse during insertion of the bottom plug into the open cartridge base bottom.

13. A method for constructing an espresso cartridge, the method comprising: obtaining a fillable espresso cartridge, the espresso cartridge comprising:
   a cartridge base comprising:
      frustoconical shaped walls;
      a cartridge base top selected from a sealed top or a sealable top; and
      an open cartridge base bottom having a smaller diameter than the cartridge base top; and
   a bottom plug configured to insert into the open cartridge base bottom, the bottom plug configured to release brewed beverage through the bottom plug during brewing; and
   if unsealed, sealing the cartridge base top, placing the frustoconical shaped brewing cartridge base onto a cartridge seat of a tool base, the sealed cartridge base top against the cartridge seat, the cartridge base top having a larger diameter than the open cartridge base bottom opposite the cartridge base top;
   attaching a cartridge lock to the tool base to retain the cartridge base against the tool base;
   using a scoop end of a scoop/tamper/seating tool to scoop a portion of brewing material;
   leveling the brewing material to obtain a proper am aunt of brewing material for the espresso cartridge;
   pouring the brewing material through a mouth of the cartridge lock and the open cartridge base bottom, into the cartridge base;
   using a tamping end opposite to the scoop end of the scoop/tamper/seating tool to tamp the untamped brewing material into the cartridge base;
   positioning a bottom plug above the cartridge base bottom and aligned with the cartridge base bottom;
   using a tamping end opposite to the scoop end of the scoop/tamper/seating tool to seat the bottom plug into the open cartridge base bottom; and
   removing the finished cartridge from the tool.

14. A method for constructing an espresso cartridge, the method comprising:
   obtaining a fillable espresso cartridge, the espresso cartridge comprising:
      a cartridge base comprising;
         frustoconical shaped walls;
         a cartridge base top sealed by foil; and
         an open cartridge base bottom having a smaller diameter than the cartridge base top; and
      a bottom plug configured to insert into the open cartridge base bottom, the bottom plug configured to release brewed beverage through the bottom plug during brewing; and
   placing the frustoconical shaped brewing cartridge base onto a cartridge seat of a tool base, the sealed cartridge base top against the cartridge seat, the cartridge base top having a larger diameter than the open cartridge base bottom opposite the cartridge base top;
   attaching a cartridge lock to the tool base to retain the cartridge base against the tool base;
   using a scoop end of a scoop/tamper/seating tool to scoop a portion of brewing material;
   using a sliding level engaged in a slot of the scoop/tamper/seating tool to level the brewing material to obtain a proper amount of brewing material for the espresso cartridge;
   pouring the brewing material through a mouth of the cartridge lock and the open cartridge base bottom, into the cartridge base;
   using a tamping end opposite to the scoop end of the scoop/tamper/seating tool to tamp the untamped brewing material into the cartridge base;
   positioning a bottom plug above the open cartridge base bottom;
   engaging a guide hole of the bottom plug with a guide hole pin on the tamping end of the scoop/tamper/seating tool;
   inserting the tamping end of the scoop/tamper/seating tool into an access mouth of the cartridge lock;
   seating the bottom plug into the open cartridge base bottom; and
   removing the finished cartridge from the tool.

\* \* \* \* \*